United States Patent
Nuti

(10) Patent No.: US 12,175,355 B1
(45) Date of Patent: Dec. 24, 2024

(54) SYSTEM, NETWORK AND METHOD FOR SELECTIVE ACTIVATION OF A COMPUTING NETWORK

(71) Applicant: SILVRETTA RESEARCH, INC., Larchmont, NY (US)

(72) Inventor: Giuseppe G. Nuti, Larchmont, NY (US)

(73) Assignee: Silvretta Research, Inc., Larchmont, NY (US)

(*) Notice: Subject to any disclaimer, the term of this patent is extended or adjusted under 35 U.S.C. 154(b) by 0 days.

(21) Appl. No.: 18/670,279

(22) Filed: May 21, 2024

Related U.S. Application Data

(63) Continuation-in-part of application No. 18/654,710, filed on May 3, 2024.

(51) Int. Cl.
- *G06N 20/00* (2019.01)
- *G06N 3/047* (2023.01)
- *G06N 3/048* (2023.01)

(52) U.S. Cl.
CPC ............ *G06N 3/048* (2023.01); *G06N 3/047* (2023.01)

(58) Field of Classification Search
None
See application file for complete search history.

(56) References Cited

U.S. PATENT DOCUMENTS

| | | | |
|---|---|---|---|
| 5,517,596 A | 5/1996 | Pechanek et al. | |
| 7,904,398 B1 | 3/2011 | Repici | |
| 11,386,319 B2 | 7/2022 | Le Gallo-Bourdeau et al. | |
| 11,494,653 B2 | 11/2022 | Zlotin et al. | |
| 11,823,027 B1 * | 11/2023 | Nuti ...................... | G06N 3/048 |
| 2020/0019862 A1 | 1/2020 | Pescianschi et al. | |
| 2020/0364545 A1 | 11/2020 | Shattil | |

(Continued)

FOREIGN PATENT DOCUMENTS

JP   2004528559   9/2004

OTHER PUBLICATIONS

Han et al., "Dynamic Neural Networks: A Survey", Dec. 2, 2021.
(Continued)

*Primary Examiner* — David R Vincent
(74) *Attorney, Agent, or Firm* — Williams Mullen; Thomas F. Bergert

(57) ABSTRACT

Embodiments of the present disclosure implement a stochastic neural network (SNN) where a subset of the nodes in the network are selectively activated based on sampling a plurality of computational paths traversing the network and based on different minimum thresholds for activation. In various embodiments, an output of the stochastic neural network is a sequence of the sampled plurality of computational paths with a corresponding sequence of output values that represent approximations of the output of the stochastic neural network. The nodes can include at least one input node, at least one output node and at least two hidden nodes, wherein the hidden nodes are positioned between the input node and the output node, and wherein sampling the plurality of computational paths involves initiating each of the plurality of computational paths from a first of the hidden nodes, wherein the first of the hidden nodes has been activated by a previous computational path.

24 Claims, 19 Drawing Sheets

(56) References Cited

U.S. PATENT DOCUMENTS

2022/0188605 A1    6/2022    Laszlo et al.
2023/0215498 A1    7/2023    Song et al.

OTHER PUBLICATIONS

Talpur et al., "A comprehensive review of deep neuro-fuzzy system architectures and their optimization methods", Neural Computing and Applications, Jan. 13, 2022.

Lin et al., "A Closer Look at Branch Classifiers of Multi-exit Arcllitectures", Computer Vision and image Understanding, Jul. 13, 2022.

Wang et al., "Neural network acceleration methods via seiective activation", IET Computer Vision, Nov. 21, 2022.

HAN et ai., Abstract from "Leaming to Weigl It Samples for Dynamic Early-Exiting Networks", Nov. 3, 2022.

Yu et al., "Boosted Dynamic Neural Networks", Nov. 30, 2022.

Zhou et al., "Synaptic mechanisms for generating temporal diversity of auditory representation in the dorsal cochlear nucleus", J. Neurophysiol113: pp. 1358-1368, Dec. 4, 2014.

\* cited by examiner

Path I

Path II

Path III

SYSTEM, NETWORK AND METHOD FOR SELECTIVE ACTIVATION OF A COMPUTING NETWORK

CROSS-REFERENCE TO RELATED APPLICATIONS

This application is a continuation-in-part application and claims the benefit of U.S. patent application Ser. No. 18/654,710 filed on May 3, 2024, the contents of which are hereby incorporated by reference in their entirety.

TECHNICAL FIELD

The present disclosure relates to machine learning, and more particularly to a system, network and method for selective activation of a computing network.

BACKGROUND

Artificial neural networks (ANN) have become ubiquitous in machine learning. One of the main challenges with ANN is the need to compute the entire network for every data query and training, which renders the network unable to run multiple computations in parallel and unable to dedicate a variable amount of computational resources depending on the difficulty of the query.

Embodiments of the present disclosure implement a stochastic neural network (SNN) where nodes are selectively activated and which can be trained on multiple objectives. The selective activation allows for executing queries in parallel on the same network, i.e., at the same time or substantially the same time. Advantages include the ability to construct and train large networks which only activate selectively and that can run multiple parallel computations over the same network.

With stochastic neural networks, if the input is fixed, the output is likely to be different (i.e., stochastic, or random to a certain extent) for multiple evaluations. This is in contrast to deterministic neural networks, where the output over multiple evaluations is the same (deterministic) with a fixed input. For example, in a deterministic system or neural network, if an activation value for a node exceeds a threshold, the node fires. On the other hand, in a stochastic system or neural network, if the activation value exceeds a threshold, there is a probability associated with firing of the node. In other words, there is a probability of the node not firing or being activated even if the activation value exceeds the threshold.

A system according to embodiments of the present disclosure can include one or more nodes and one or more synapses, wherein each synapse connects a respective pair of nodes. The system can further include one or more processing elements, wherein each of the processing elements can be embedded in a respective synapse or a respective node, and wherein each of the processing elements is adapted to receive an input and generate an output based on the input. The system, network and method according to embodiments of the present disclosure can be configured to operate such that, upon receipt of a first problem input, a first subset of the nodes is selectively activated. In various embodiments, once a synapse or node is computed, the sampling of the synapse or node determines whether the next node will be activated. The computed value of a node/synapse may be used by a subsequent node/synapse even when the node is not activated. In other words, while the activation of a synapse/node is stochastic (and binary), once activated, embodiments of the present disclosure can choose to use the computed activation probability value instead of approximating it via repeated binary samples, significantly speeding up computation of subsequent synapses/nodes and finally the output values (i.e., the probability of activating one for the possibly multiple output nodes). According to embodiments, one or more of the synapses can feed into a node and activation of the node is dependent upon one or more activation weights of each of the synapses. Further, embodiments of the system, network and method of the present disclosure operate such that different network regions can be activated for different inputs and this activation can occur in parallel. Selective activation of a subset of nodes or synapses can be based on different minimum thresholds for activation.

Embodiments of the present disclosure also provide a method for partially or selectively activating a computing network, where the network includes multiple nodes and multiple synapses, where each of the synapses connects a respective pair of nodes. Each synapse or node has one or more respective activation weights, and a first subset of the nodes is selectively activated based on sampling a plurality of computational paths traversing the stochastic neural network and based on different minimum thresholds for activation. Each node is not necessarily activated during training or for each problem input. In various embodiments, a super-imposable stochastic graph is employed with training, regularization and load balancing.

DETAILED DESCRIPTION OF EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

It will be appreciated that reference to "a", "an" or other indefinite article in the present disclosure encompasses one or a plurality of the described element. Thus, for example, reference to a node may encompass one or more nodes, reference to a synapse may encompass one or more synapses and so forth.

Figure 1:
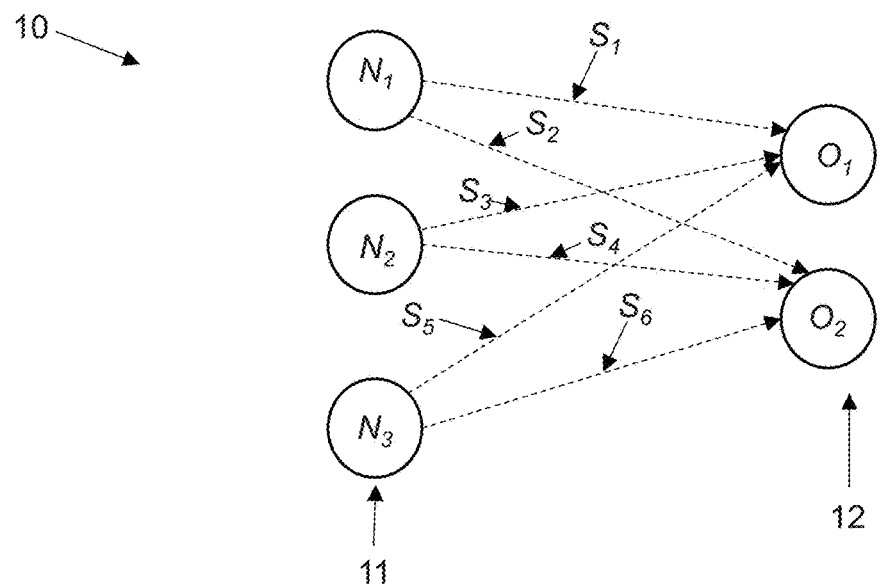
FIGS. 1 and 2 are diagrams of stochastic neural networks in accordance with embodiments of the present disclosure.

As shown in the network 10 of FIG. 1, input nodes $N_1$, $N_2$ and $N_3$ are indicated generally at 11 and output nodes $O_1$ and $O_2$ are indicated generally at 12. Each of the input nodes $N_1$, $N_2$ and $N_3$ has a respective synapse extending to a respective output node $O_1$ and $O_2$. For example, synapse $S_1$ extends from input node $N_1$ to output node $O_1$, synapse $S_2$ extends from input node $N_1$ to output node $O_2$, synapse $S_3$ extends from input node $N_2$ to output node $O_1$, synapse $S_4$ extends from input node $N_2$ to output node $O_2$, synapse $S_5$ extends from input node $N_3$ to output node $O_1$, and synapse $S_6$ extends from input node $N_3$ to output node $O_2$.

Each of the synapses $S_1$-$S_6$ may have a respective processing element embedded therein or each of the nodes may have a respective processing element embedded therein. Embodiments of the present disclosure can operate with processing elements solely in the synapses, with processing elements solely in the nodes or with processing elements that are partially in the node (e.g., shared weights) and partially within the synapses.

Regardless, each of the processing elements is adapted to receive an input and generate an output based on the input. Each of the nodes or each of the synapses further has one or more respective activation weights associated therewith. Thus, in one embodiment, synapse $S_1$ has at least an activation weight $w_1$ associated with it, synapse $S_2$ has at least an activation weight $w_2$ associated with it, synapse $S_3$ has at least an activation weight $w_3$ associated with it, synapse $S_4$ has at least an activation weight $w_4$ associated with it, synapse $S_5$ has at least an activation weight $w_5$ associated with it, and synapse $S_6$ has at least an activation weight $w_6$ associated with it. Alternatively, each of the nodes may have one or more respective activation weights associated therewith.

Figure 2:
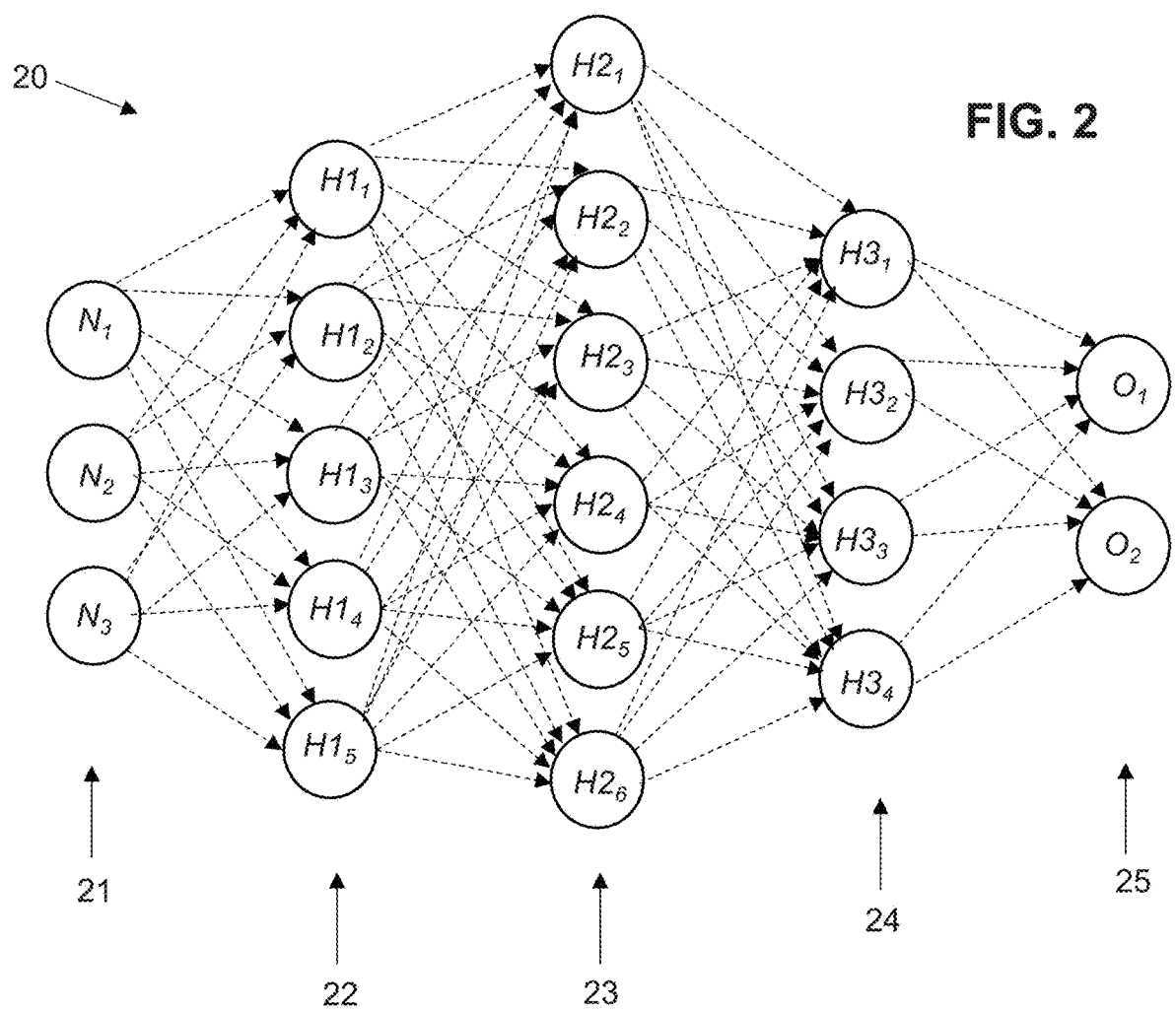

FIG. 2 shows a larger network 20 than network 10, with input nodes illustrated generally at 21, a first set of hidden layer nodes indicated generally at 22, a second set of hidden layer nodes indicated generally at 23, a third set of hidden layer nodes indicated generally at 24 and output nodes indicated generally at 25. The input nodes $N_1$, $N_2$ and $N_3$ have respective synapses extending from the input nodes $N_1$, $N_2$ and $N_3$ to each of the hidden layer nodes $H1_1$, $H1_2$, $H1_3$, $H1_4$, $H1_5$ and $H1_6$ in the first hidden layer 22. The nodes $H1_1$, $H1_2$, $H1_3$, $H1_4$, and $H1_5$ in the first hidden layer 22 have respective synapses extending to each of the hidden layer nodes $H2_1$, $H2_2$, $H2_3$, $H2_4$, $H2_5$ and $H2_6$ in the second hidden layer 23. The nodes $H2_1$, $H2_2$, $H2_3$, $H2_4$, $H2_5$ and $H2_6$ in the second hidden layer 23 have respective synapses extending to each of the hidden layer nodes H31. H32, H33, and H34 in the third hidden layer 24. The nodes H31. H32, H33, and H34 in the third hidden layer 24 have respective synapses extending to each of the output nodes $O_1$ and $O_2$. Network 20 is a fully connected network. It will be appreciated that embodiments of the present disclosure can operate in networks that are not fully connected, as well as networks where nodes may skip one or more layers. Nodes may be connected to neighboring nodes both within the same layer and/or in subsequent layers.

Thus, as shown in FIGS. 1 and 2, each of the preceding synapses can feed into a node. Further, activation of each node is dependent upon the activation status of each of the nodes or synapses that feed into it. As examples of embodiments of this invention, a node can stochastically activate in a variety of situations, such as: (i) if any of the incoming nodes or synapses are activated, (ii) if all of the incoming nodes or synapses are activated, (iii) if a transform of the incoming nodes or synapses is activated and/or (iv) if a minimum total activation status is achieved from the incoming nodes or synapses; (v) if a computational path is directed through one or more of the outgoing synapses (but not necessarily all). It will be appreciated that the one or more activation weights associated with one synapse or node can be different from the one or more activation weights associated with a different synapse or node. As further shown in FIGS. 1 and 2, each node except for an output node feeds into each of the subsequent synapses. It will be further appreciated that a computational path will traverse (move from input node(s) towards the output nodes(s)) being routed through one or more (but not necessarily all) of the outgoing synapses, computing and/or updating the values of the nodes and synapses.

According to embodiments of the present disclosure, the activation weights (and optional non-linear activation functions) may be at the synapse level or at the node level. In other words, the gating/routing can be embedded in the synapse or in the node and no separate gate or other components are required. Further, the presently disclosed system, network and method employ stochastically activated nodes for which the computation is driven by a stochastic function of the activation value. As described elsewhere herein, the present system, network and method provide stochastic activation where the parameters of the network that control the activation and the output transform are embedded in either the synapses between nodes or in the nodes.

Routing of a computational path can be determined by a function, such as SoftMax, Spherical, etc.:

$$g(s_1, \ldots, s_i) = S\left(w_0 + \sum^{j=1,\ldots,i} w_j p(n_j)\right)$$

where $g(\cdot)$ represents the routing probability, $S(\cdot)$ the SoftMax function (as an example), and $w_j$ the weights which, in this case, are specific to each outgoing synapse.

As an example, the node-specific value can be represented by the activation of any one incoming synapse or node:

$$t(p(n_1, \ldots, n_m)) = \sum^{i=1,\ldots,m} p(n_i)$$

where n represents node, p represents the output of the incoming synapse and the subscript i indicates the $m^{th}$ incoming synapse or node into a node. The above, in essence, represents the expected number of computational paths that will be traversing this node for a given input and current partial activations.

As an alternative formulation, the synaptic- or node-specific activation for the subsequent node can be expressed as a function of a mixture of common node values and synaptic-specific values, e.g.:

$$g(s_1, \ldots, s_i) = (\text{ReLU}(w_0 + \Sigma^{j=1, \ldots, i} w_j p(n_j) - c_k)^2 / R$$

where p represents the output of the incoming synapse and the subscript i indicates the $i^{th}$ incoming synapse or node, w the shared weight, and $c_k$ the $k^{th}$ centroid, which is synapse-specific. R is the sum of all outgoing synaptic values (normalizing the output into a routing probability) and reLu is the standard Rectified Linear Unit. Note that the above are just examples of possible routing functions that determine which subsequent node(s) will be computed and/or updated. The node's output, which can represent the probability of activation and/or the expected number of computational paths that will be traversing the node, allow us to leverage the herein proposed Beacon Computing approach to significantly speed up the sampling of a stochastic neural network.

The computation of the network can be done via multiple paths that can be fired simultaneously, whereby any path activating an output node can further increase the precision of the output value until sufficient precision is obtained, or a sufficient number of paths hit an output node (either in expectation or in stochastic draws, or a maximum number of paths have been fired). Specifically, a path runs through the network activating nodes stochastically based on the activation probability as exemplified above. In its simplest form, the terminal value can be estimated at one of the possible multiple output nodes by accumulating the number of paths that are routed to the output node (either in expectation, represented by the node's value, or as a count of the stochastic routing that has resulted in a path terminating at the output node. The network can run in hybrid mode where a computed (yet not necessarily activated) synapse or node is then used as a full-precision numerical value, regardless of it being selected as routing of a computational path. This provides the technical advantage of automatically computing what the approximate estimation of firing multiple paths would yield. Training of the stochastic network can occur over all computed synapses or nodes, or only the activated synapses or nodes. In other words, once a synapse and/or node is activated, using the probability of activation (or the expected number of computational paths that will be traversing it) will compute the outcome probabilities without having to fire multiple paths to estimate such probabilities, yet the firing of a node and/or synapse is done stochastically to determine if subsequent nodes need to be sampled. Furthermore, using the hybrid fire-and-compute approach provides embodiments of the present disclosure with the ability for a synapse/node to use previously computed values unless a new input to such synapse/node has stochastically been activated and computed, thus providing the technical advantage of saving significant computational resources.

Beyond synaptic- or node-specific parametrization, the inference approach according to the present disclosure can be done via multiple paths which traverse the network activating nodes independently. The information computed by a path can be utilized by any subsequent path traversing the same node. In essence, the computation is an approximation which becomes progressively more precise as more paths activate the nodes or synapses, with the limiting case that an infinite number of paths would activate the entire network. The number of paths needed will depend on the stability of the approximation as more paths reach a specific target node, thus providing a fast approximation which gets refined as more paths travel through the network. The employment of a fast approximation followed by more precise, yet time consuming, solutions can be critical for time-sensitive decisions, such as in self-driving car applications and more generally, in robotic applications, for example.

It will be appreciated that in order to simultaneously train for the solution of the inference problem(s) and provide computational efficiency, the output value and probability of activation (or expected number of traversing paths) are jointly optimized according to the present disclosure, ensuring that the network is trained to output values that minimize the error with respect to the desired output and its activations set. Thus, the objective function and the transformations from input into any of the output nodes includes both the transformed output and the likelihood of the output node being activated (or a derivative, i.e., functional transformation, thereof, such us the expected number of computational paths that will be traversing this node for the current or recent inputs). Importantly, multiple output nodes can be part of the same network (not necessarily mutually exclusive), selectively employing network resources based on the inputs.

In various embodiments, an output node can be constructed with a soft max connecting all mutually exclusive values (including true/false only) to ensure that training is unbiased with respect to activation proportions of output values. The network can be further segregated between positive activation inner layers and negative activation inner layers, where a negative activation has the function of blocking further activations stemming from a node.

Training optimizes the output value and probability of activation, ensuring that the network is trained to output values that minimize the error with respect to the desired output and the activation. The objective function and the transformations from input into any of the output nodes includes both the transformed output and the likelihood of the output node being activated (or a derived value, i.e., functional transformation, thereof). As described herein, multiple output nodes can be part of the same network (not necessarily mutually exclusive), selectively employing network resources based on the inputs.

Regularization can be applied as per approaches understood in the art (e.g., lasso or L1 regularization and/or ridge or L2 regularization) or by evaluating the co-activation of input synapses and/or nodes. The ability to assess co-activation as a proxy for the uniqueness of an incoming synapse or node provides forms a natural regularization method based on the informational value of activations where two inputs that are highly correlated can be merged into one while recycling the unused synapse or node by drawing new random weights with a de minimis new input weight. Among other things, this promotes efficient utilization of network resources.

It will be appreciated that nodes need not connect only to the next layer but can connect with layers further out, which can improve performance in that the connection layer can be chosen from a uniform distribution of layers available before the output node, or using other methods, such as a geometric distribution, for example. Furthermore, nodes need not be fully connected to the next layer.

As shown in FIGS. 3-8, various embodiments of the present disclosure provide a stochastic neural network where nodes are selectively activated (calculated) based on sampling computational paths that traverse the network. A computational path selectively activates a sequence of nodes, whereby (one of) the computed outputs of each node is dependent upon and/or correlated to the probability of such a node being activated (or the expected number of paths that will be traversing it) for a set of input values. It can be further appreciated that the decay of a node's output is not necessarily to be set to zero immediately after inference of a set of inputs but can decay more slowly, thus maintaining a memory of the previous inputs. As such, the set of activated nodes and synapses for a given input may change, depending on which inputs where previously run, in which sequence, and how much time has passed.

Figure 3:
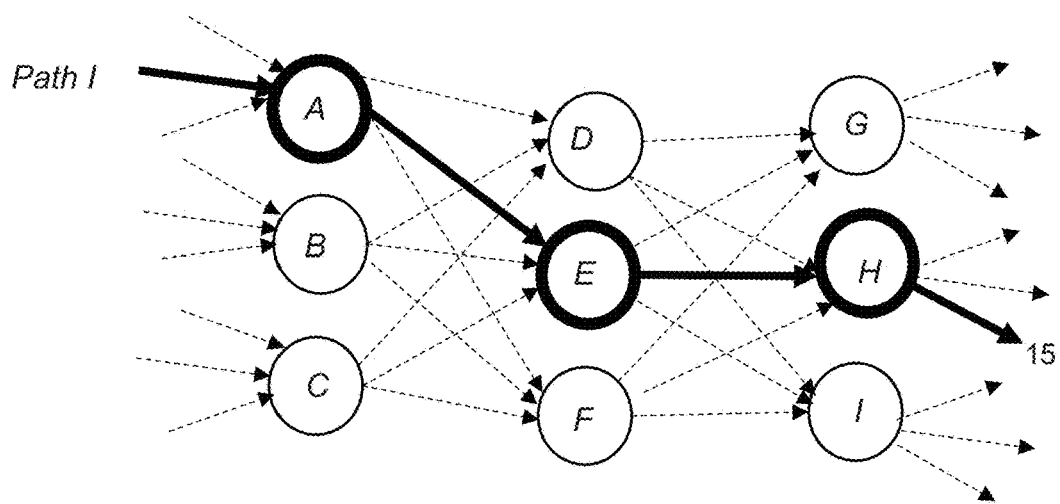
FIGS. 3 through 8 are diagrams showing computational paths and selective activation in accordance with embodiments of the present disclosure.
Figure 3:
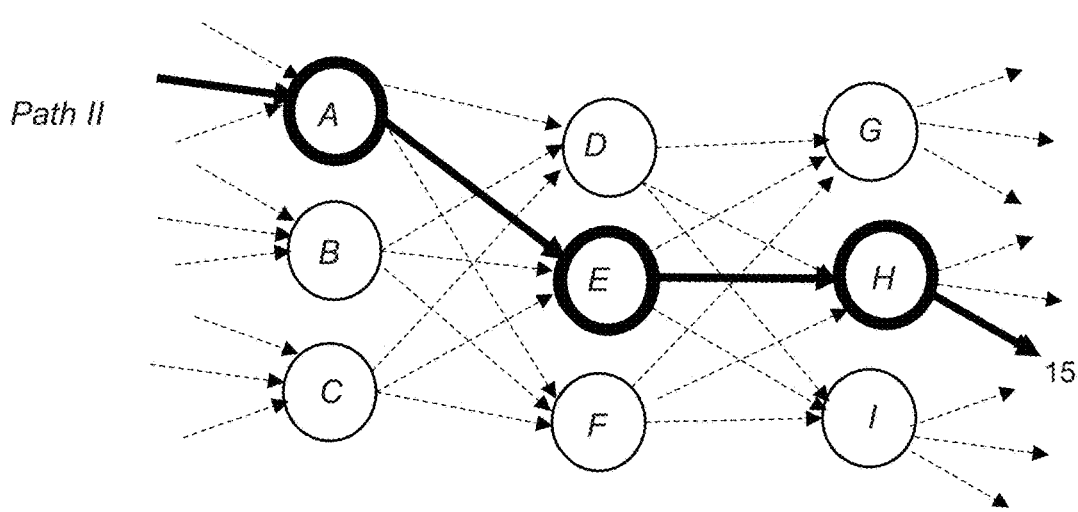
Figure 3:
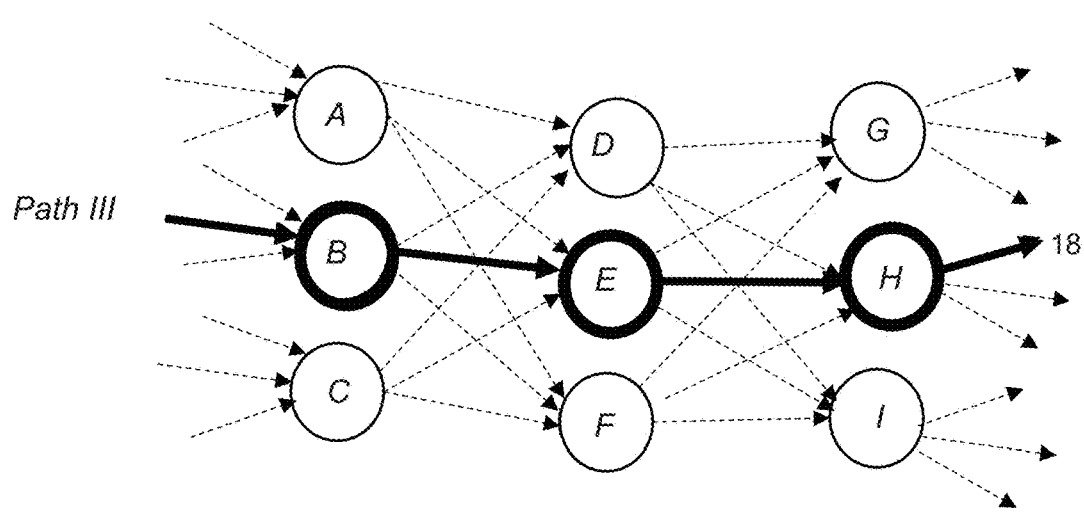

FIG. 3 is a diagram showing three computational paths in dark solid lines (Path I, Path II and Path III) traversing the stochastic neural network. The traversal of the network can occur either sequentially or on parallel computational threads. As can be seen in FIG. 3, Path I and Path II traverse the same set of nodes, A, E and H, whereas Path III traverses a different set of nodes, B, E and H, combining with Paths I and II in node E. It will be appreciated that a path need not activate a single synapse or node but may activate multiple synapses or nodes. The paths can be sampled independently or may build upon one or more prior path's computed values. In FIG. 3, Path III, upon reaching node E, combines the previously computed values by both Path I and Path II. Further, the output 18 of Path III is different from the outputs 15 of Path I and Path II.

Figure 4:
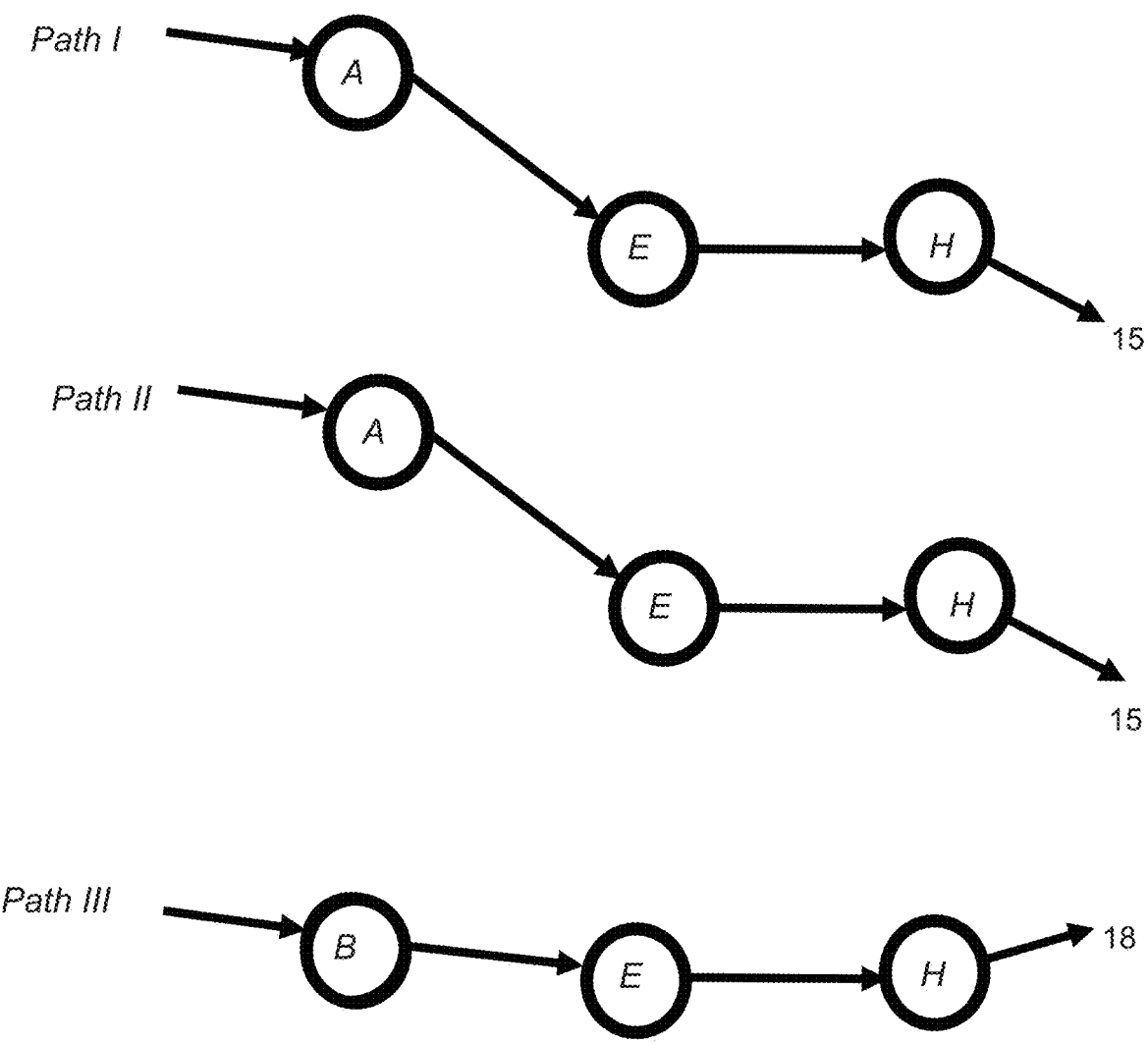

In FIG. 4, the sequence of outputs result in the same synaptic activation for Path I and Path II, eventually switching to a different synaptic activation for Path III.

It will be appreciated that, in order to improve the computational efficiency, the sampling of paths need not start from one or more input nodes. Thus, as shown in FIGS. 3 and 4, nodes A, B and C are not input nodes but rather are hidden nodes. By leveraging at least one of the values in a hidden node, which is correlated to the probability of the node being activated or the number of computational paths expected to traverse the node, a hidden node can be sampled directly, thereby reducing the computational load significantly. A computational path can now extend from any previously activated node that has unactivated connecting nodes, as illustrated in FIG. 3. Thus, even though out of all the nodes in the network, there will be at least one input node, at least one output node and at least two hidden nodes, with the two or more hidden nodes positioned between the one or more input node(s) and the one or more output node(s) in the stochastic neural network, it will be appreciated that sampling the computational paths can be initiated from one of the hidden nodes, wherein the hidden node from which the computational path is sampled has been activated by a previous computational path (which can mimic the effect of a computational path reaching the hidden node without needing to sample from the input nodes).

Figure 5:
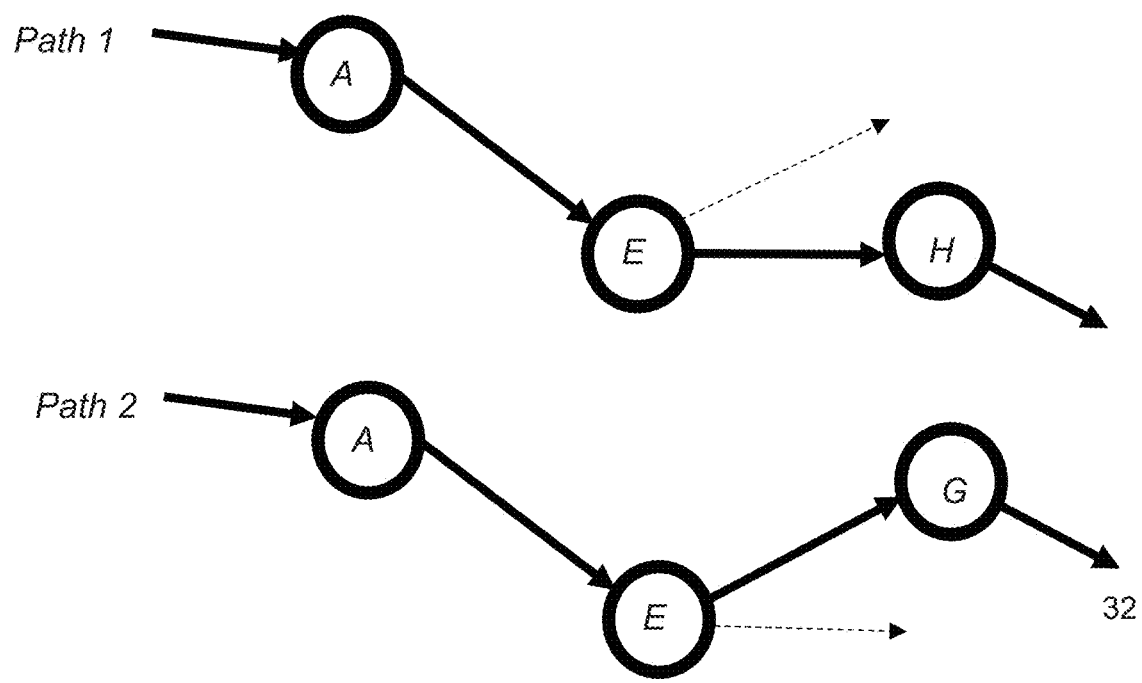

As shown in FIG. 5, two sampled paths, Path 1 and Path 2, result in Path 2 activating the central synapse of node G. Given that at least one of the values of node E after Path 1 activates, it is dependent upon and/or correlated to the probability of node E being activated, e.g., p(E), resampling the next path from the start can be avoided by directly sampling the unactivated outgoing synapses of node E with probability p(E) multiplied by the probability of selecting each yet inactivated synapse, e.g., the left of synapse of node E in Path 1. In this way, the resulting output 32 of Path 2 is or can be essentially equivalent to a full sampling approach while significantly reducing the need to sample full paths, which can be prohibitively expensive as well as time and resource intensive.

In various embodiments according to the present disclosure, the output of the entire network is determined as a sequence of sampled computational paths with a corresponding sequence of output values that represent approximations of the network's full computation. In such embodiments, the ability to cease the sampling is achieved once the approximation is sufficiently precise. Sufficient precision can be addressed using, among various methods, the currently available probability of activation of the output node; the stability of the output values, and in other ways.

In this approach, it is appreciated that re-starting the computation from the inputs would result in an approximately equal outcome as starting the computation from an internal node that has previously been activated, inasmuch as the probability of the internal node being the seminal one for a new computational path is dependent upon and/or correlated to its value (in absolute terms or relative to other internal nodes). The computation can stop as soon as one of the potentially many output nodes has received sufficient activation.

Figure 6:
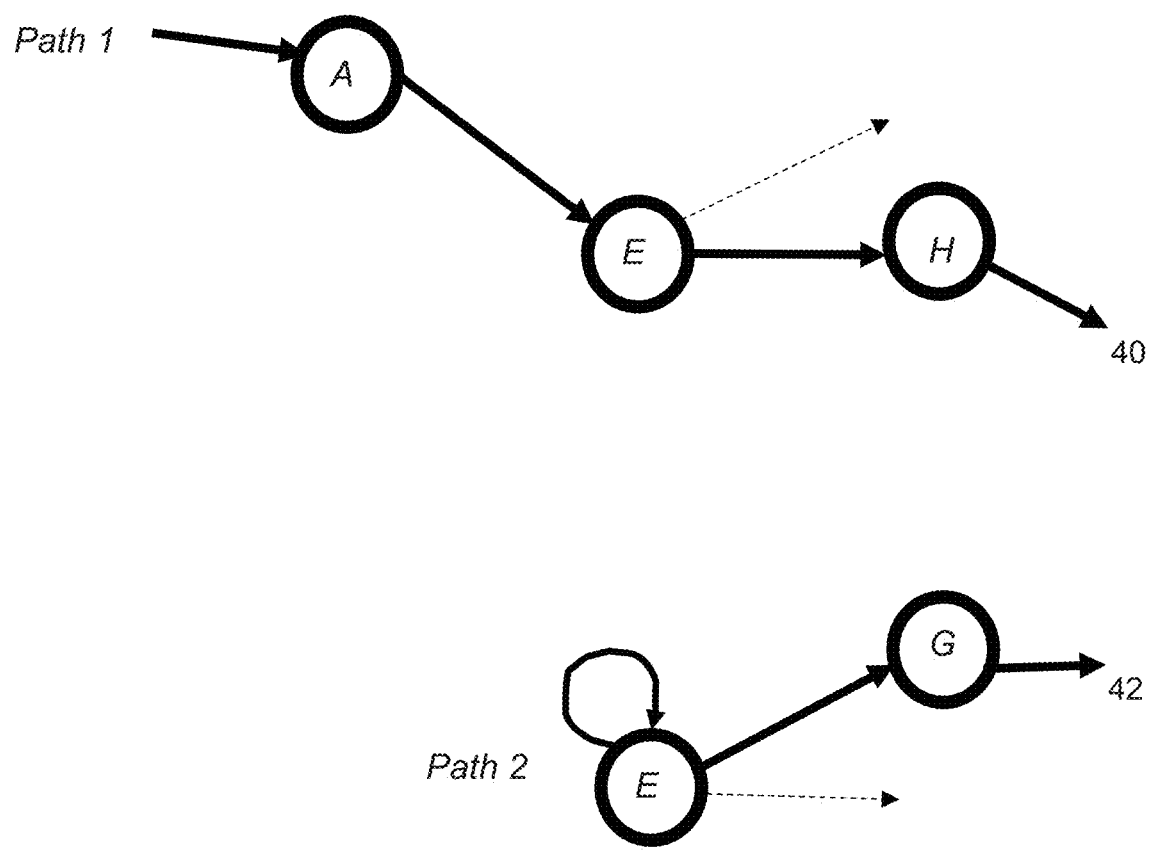

As shown in FIG. 6, the computational improvement can be further enhanced by avoiding having to continuously sample previously activated nodes for possible new paths of inactivated synapses. This can be accomplished by sampling a waiting time directly. As shown in FIG. 6, after node E is activated by Path 1, a sampling is taken from a geometric distribution for a waiting time, which is when node G will be activated in Path 2. If the solution has already been determined with sufficient precision, it is no longer necessary to conduct further calculations. The waiting time can either be sampled from the corresponding distribution or used directly in expectation. Instead of sampling Path 2 into node G starting from the input nodes (e.g., node A), embodiments of the present disclosure sample directly starting from node E given it is known what the probability is, relative to other nodes, of a path traversing node E and, for example, activating node G. The output of Path 1 is shown at 40 and the output of Path 2 is shown at 42.

Thus, it will be appreciated that the activation of one or more nodes throughout the network can be scheduled by one or more incoming nodes to occur at a later time which corresponds to a stochastically drawn waiting time (or the expected value) of the sequence of paths that would traverse the network. The waiting time can be drawn (or set to the expected value) without the need to create paths that traverse the entire network from the start given that one of the node's values, combined with the synaptic activation value represent the probability of that path activating. The waiting time can be used directly or simply as an ordering for which synapses are to be activated next, thus reducing both the computational time (inasmuch as it is no longer necessary to sample paths from input nodes) and in actual time (inasmuch as the waiting time is an ordering that can be processed sequentially, regardless of the magnitude of the gap between waiting times or between now and the next synapse to be activated).

Figure 7:
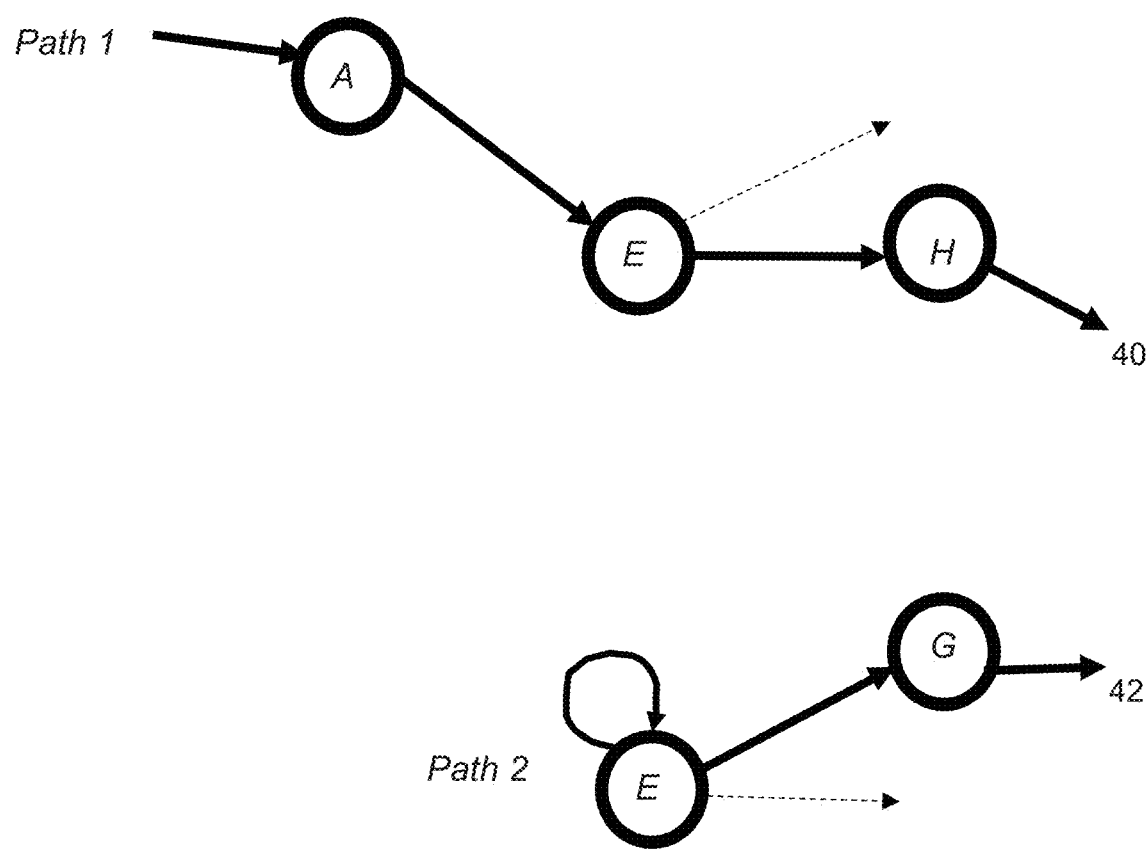

With reference to FIG. 7, Path 2 into node G is set to be fired at a specific time in the future, either drawn from the corresponding waiting time distribution or as an expected wait. In various embodiments, the sample or expected delays computed as described with regard to FIG. 6 can be stored in an ordered list of delays, thus having to avoid the waiting time, which would represent paths traversing already activated nodes. The ordered list can be filled with all or some of the delays and consumed in the approximate order of shortest wait first, avoiding the actual waiting time, which represents sampling nodes previously activated by other paths.

Combined approaches involving starting the computation at an internal node and scheduling of the activation of nodes can be employed according to aspects of the present disclosure, including where multiple paths are sampled in parallel (essentially at the same time) or independently by each node/synapse. This can be achieved both as a software solution or in a hardware-driven solution according to various embodiments of the present disclosure.

It will be appreciated that a computational path entering a node can further activate a single subsequent node or multiple subsequent nodes. Further, each node can act independently to balance its probability (or output) of activation with the connected nodes, possibly adjusted by the synapse's values. In various embodiments, this balancing is embodied by only causing a recalculation if the updated value is sufficiently large. As such, small changes are ignored, saving on computational resources. When the difference exceeds a threshold, a new path or a single step adjustment can be fired (or stochastically; proportionately to the difference in outputs). It will be appreciated that the values of previously activated paths can be maintained for future use by other paths. The memory of previously computed paths can be constant (over one or more inference problems) or decay over time, thus providing a statefulness of the activated nodes and synapses.

Figure 8:
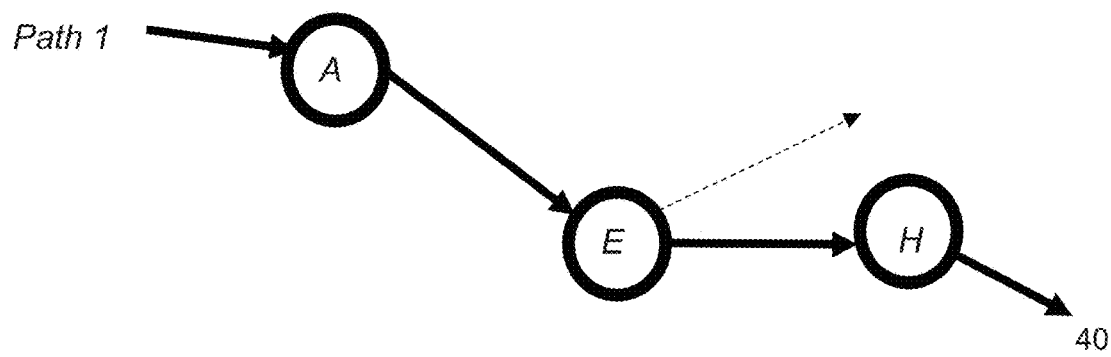
Figure 8:
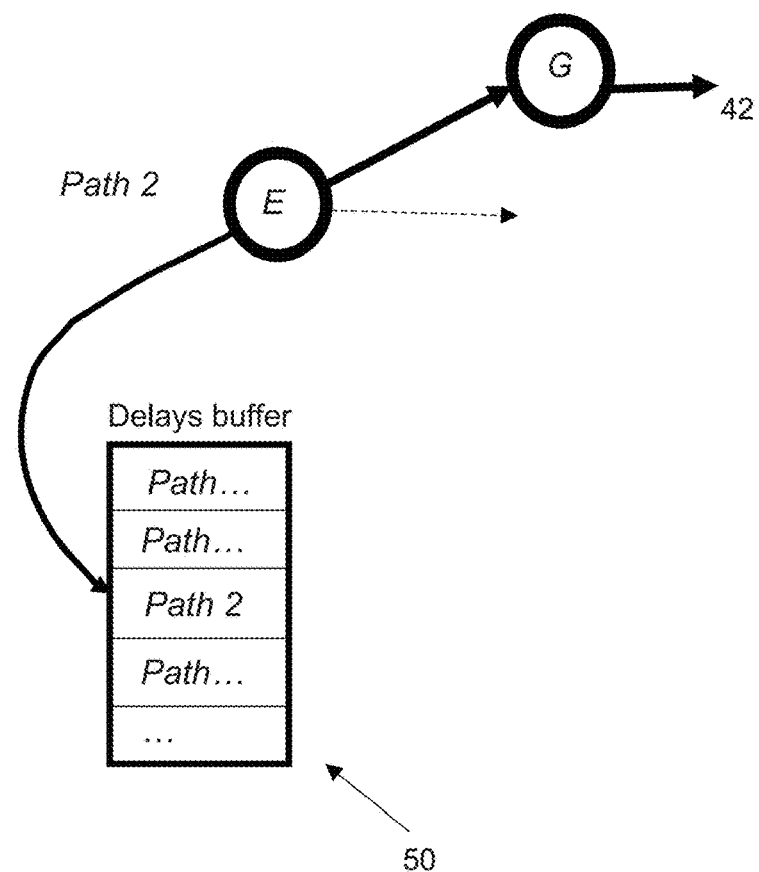
Figure 9:
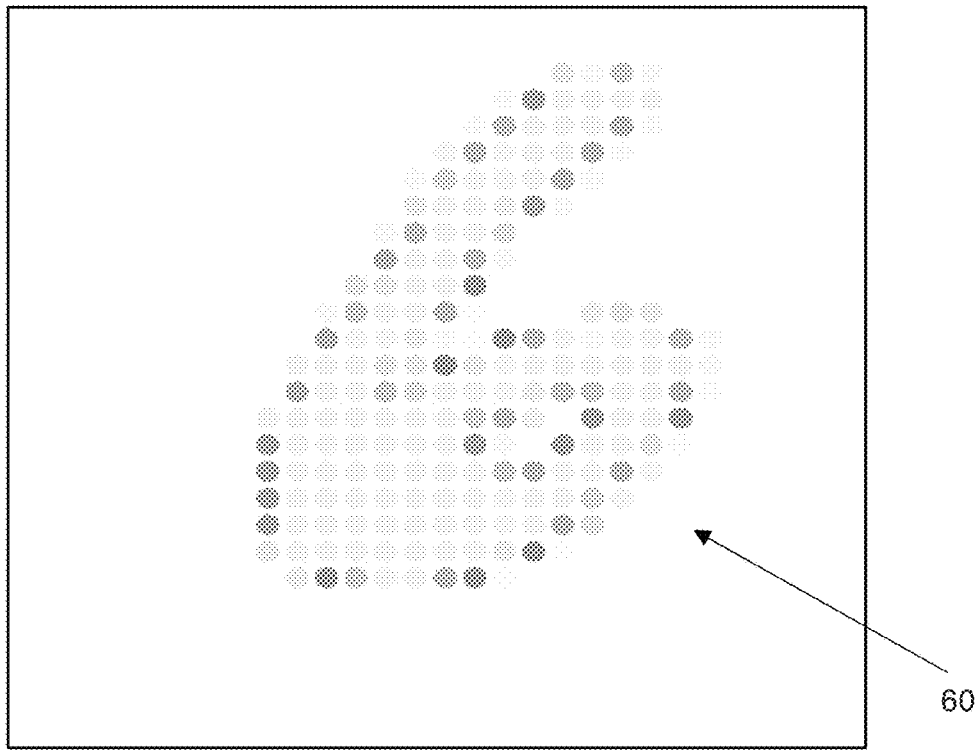
FIGS. 9 and 10 are images of digits employed in an exemplary character recognition example of operation in accordance with embodiments of the present disclosure.
Figure 10:
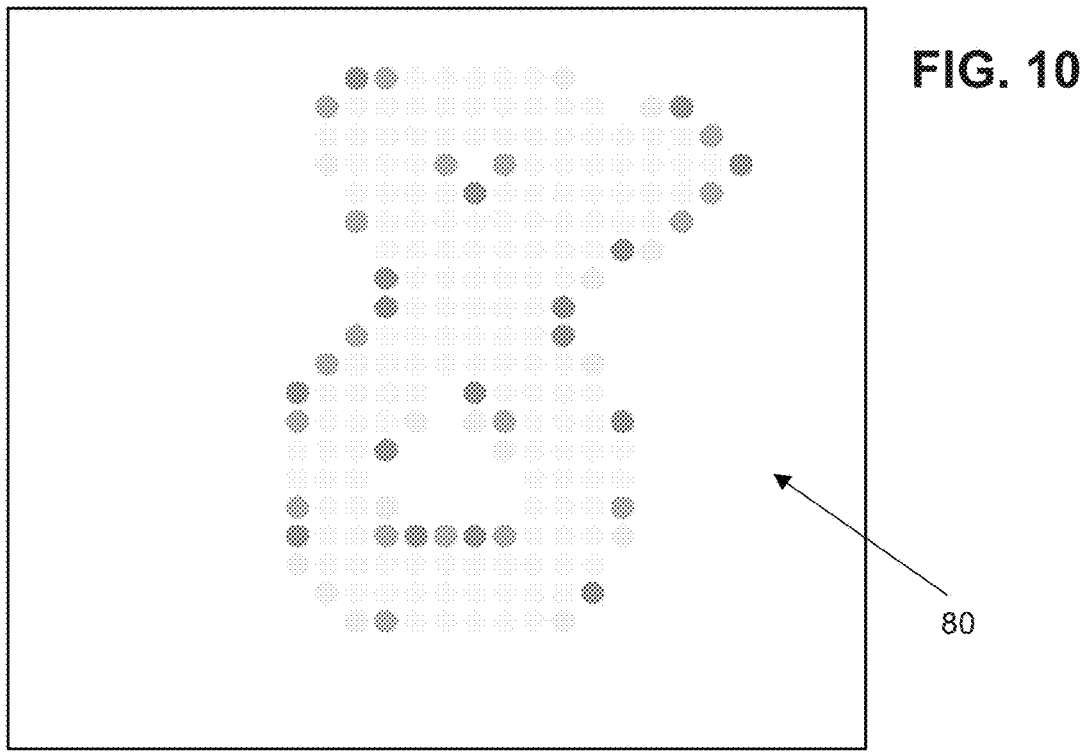

As shown in FIG. 8, for example, the sampled or expected delay for Path 2 into node G can be saved in a buffer 50 for all or a portion of the delays, according to embodiments of the present disclosure. Processing can be performed on a first in-first out basis, for example. One or more of the paths with the shortest waits can be activated by the next available thread without waiting for the actual computed wait time as it is only the ordering that matters in computing the next sub-network to sample.

Since the probability of exploring a new path can be taken as p (or inferred by through the expected computational paths to traverse a node), which is the approximate probability of activation times the probability of sampling a new path (yet to be explored), it is possible to directly sample the waiting time until the new pathway would be activated (e.g., a geometric distribution with expected value 1/p). The waiting time can be used directly (as in waiting that amount of time), or used to order the synaptic or node activations, which produces a significant reduction in compute time and allows the network to be computed in parallel. In various embodiments, the sampling of the waiting times can be used as an ordering without needing to actually wait the sampled time, which assists with speed of computation. Further, the waiting time may not necessarily be sampled but can be the expected value, a quintile, and so forth.

It will thus be appreciated that embodiments of the present disclosure provide a system and method involving a stochastic neural network with nodes, synapses and processing elements, wherein each of the synapses provides a connection between a respective pair of the nodes, and wherein each of the processing elements is embedded either in a respective node or in a respective synapse, wherein each of the processing elements is adapted to receive an input and generate an output based on the input. For example, the output of one of the synapses can feed into a first subset of the plurality of nodes and can have a synaptic value computed according to a path preceding that synapse. The computational load of the stochastic neural network can be balanced based on enhancing diverse activation of the nodes as described herein.

Regularization can be employed to reduce the overall time of computation, to reduce the computational load and/or to increase the precision of each stochastic inference. An effective way to achieve these goals is to promote nodal activation diversity, as described elsewhere herein. The speed of computation can be reduced by using fewer synapses, the precision and robustness can be increased by using a wider variety of synapses for different inference tasks, and the computational load can be minimized by limiting the firing rate of synapses.

It will be appreciated that embodiments of the approach as described herein permit multiple paths to be run in parallel through the graph. Since nodes are selectively activated, the computational lock over a node/synapse is selectively applied, allowing for multiple paths to compute in parallel, for example, at or substantially at the same time. For purposes of the present disclosure, "substantially at the same time" can mean nearly at the same time, approximately at the same time, very close to the exact same time, essentially at the same time as well as exactly the same time. Each path can activate one or more output nodes, thus providing the ability to train a multi-objective network (i.e., a network with multiple output nodes that are not necessarily mutually exclusive). The signature of a path, saved at synaptic or node activation level, allows for efficient training of the network over multiple objectives as described herein.

In various embodiments, the probability of activation can be modulated directly by adding a penalty for the probability of nodal activation. This will reduce the number of nodes fired, which will depend on the difficulty of the specific input sample/query once the network is trained. This form of activation regularization can be constant across the network or depend on the state of the network, the phase of training (e.g., initial versus late-stage fine-tuning), etc.

It will be appreciated that embodiments of the present disclosure allow for different types of synapses and/or nodes with different activation functions to co-exist depending on the problem (e.g., a binary input to solve SAT-3 style problems or a continuous input to solve a visual recognition task). It will further be appreciated that the neural network construct according to the present disclosure is applicable to a wide variety of problems, in the domain of supervised and unsupervised learning, such as vision and speech recognition, etc. The presently disclosed system, method and network thus facilitate construction of larger networks where the network need not be computed in its entirety every time, along with the construction of more technically efficient networks, both computationally and in terms of energy consumption, which is well suited for mobile devices where energy consumption is naturally constrained, for example.

According to various embodiments of the present disclosure, a system can include one or more nodes and one or more synapses, wherein each synapse of the plurality of synapses connects a respective pair of the plurality of nodes. The system can further include one or more processing elements, wherein each of the processing elements is embedded in a respective synapse or a respective node, and wherein each of the processing elements is adapted to receive an input and generate an output based on the input. The system can be configured to operate such that a first subset of the nodes is selectively activated based sampling a plurality of computational paths traversing the stochastic neural network.

In various embodiments, upon receipt of a different problem inputs, different subsets of the nodes are selectively activated.

As an example of operation using the MNIST character recognition dataset, the overall results and a comparison of activations for two samples are described, with reference to FIGS. 9 through 17. After constructing and training a network with five input filters of depth twenty and width thirty (with three outgoing synapses and skipping connections with probability 0.1), the out of sample performance (using the standard test dataset) is tested for a relatively simple recognition sample (the digit "6" as shown at 60 in FIG. 9) and a relatively more taxing one (the digit "8" as shown at 80 in FIG. 10).

Figure 11:
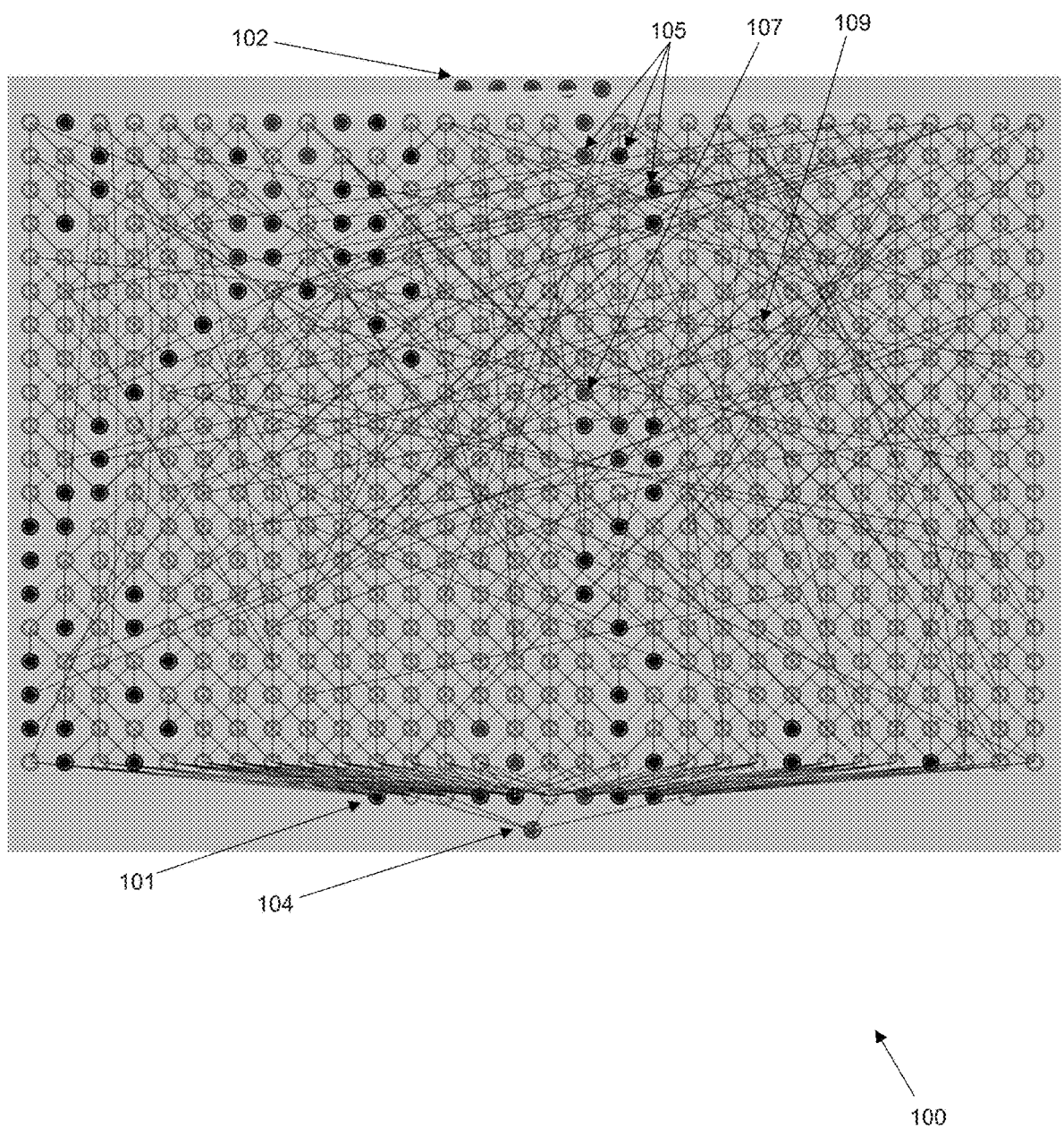
FIGS. 11 through 16 are exemplary network diagrams showing activated nodes for various samplings of computational paths in the exemplary character recognition examples of operation in accordance with embodiments of the present disclosure.
Figure 12:
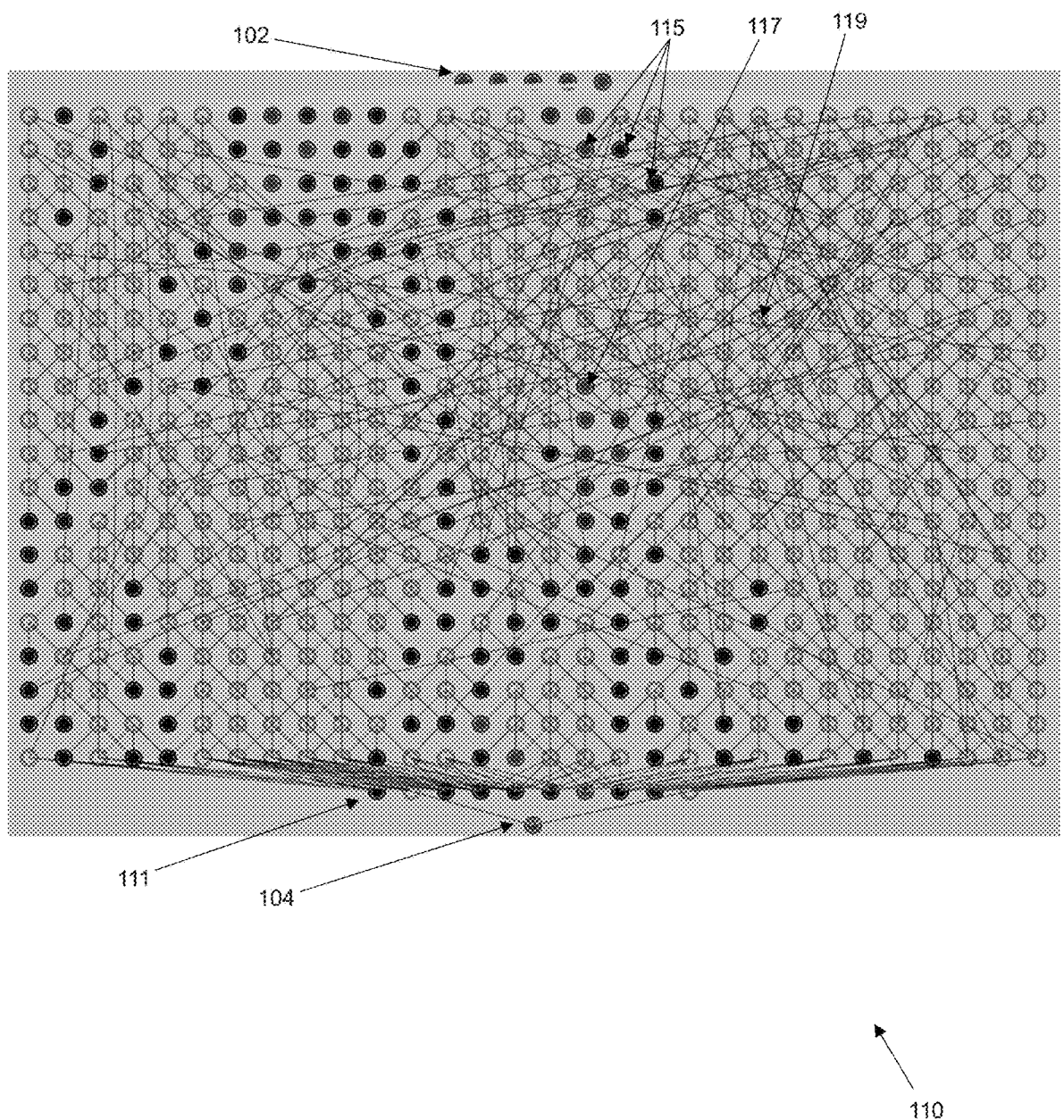
Figure 13:
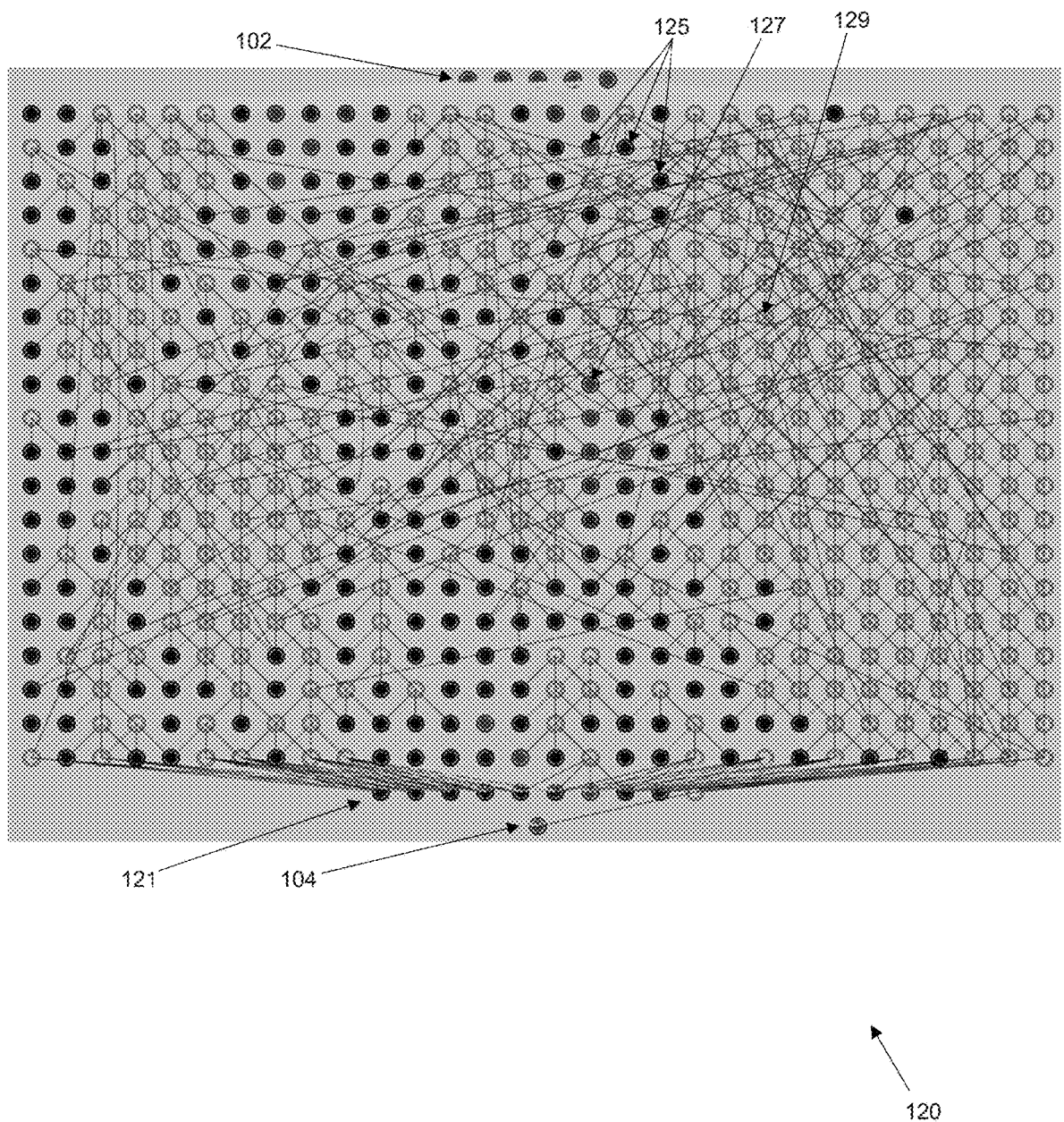

Networks for the digit "6" example are shown in FIGS. 11 through 13, with FIG. 11 showing the network 100 and activated nodes (e.g., 105) after sampling one computational path, FIG. 12 showing the network 110 and activated nodes (e.g., 115) after sampling five computational paths and FIG. 13 showing the network 120 and activated nodes (e.g., 125) after sampling ten computational paths. The activated nodes are shaded in FIGS. 11 through 13. The input nodes 102 are shown at the top, with calculations proceeding downward toward the output SoftMax node 104 at the bottom of the network.

The links between nodes can indicate synaptic computation where the values have been computed, though not necessarily activated. Further, some nodes (e.g., 107, 117, 127) have a higher activation probability and some nodes (e.g., 109, 119, 129) have not been activated.

Figure 14:
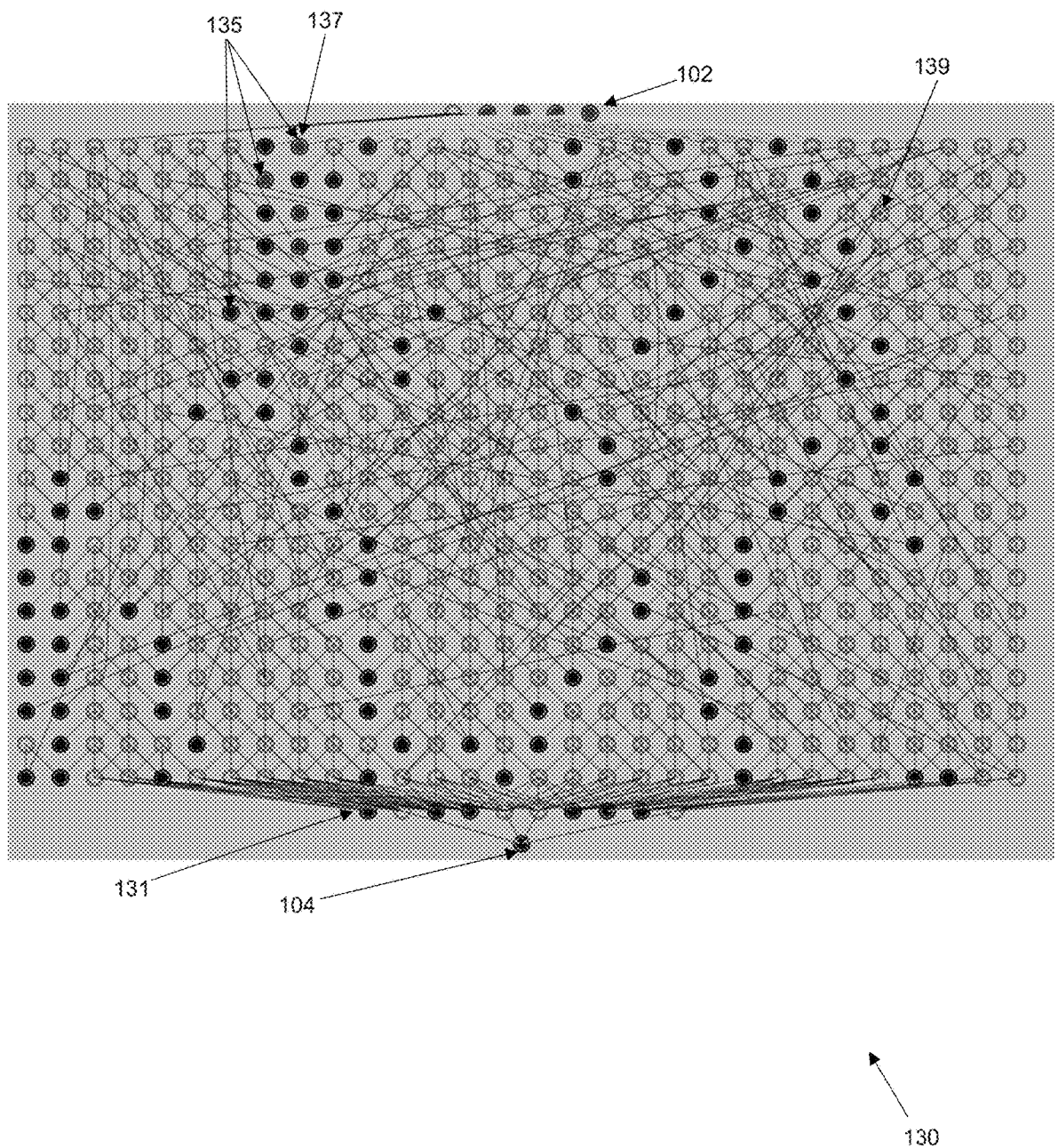
Figure 15:
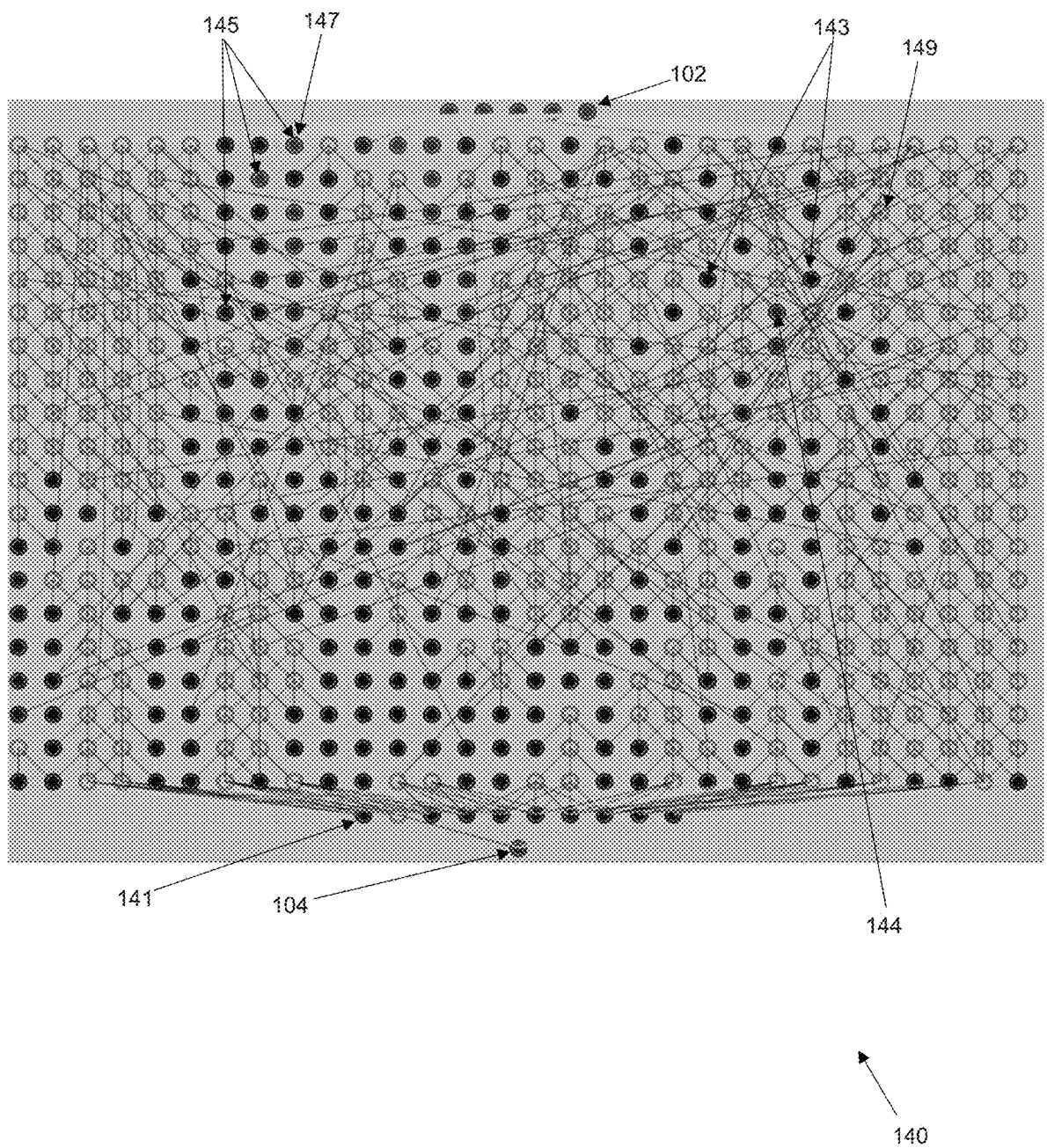
Figure 16:
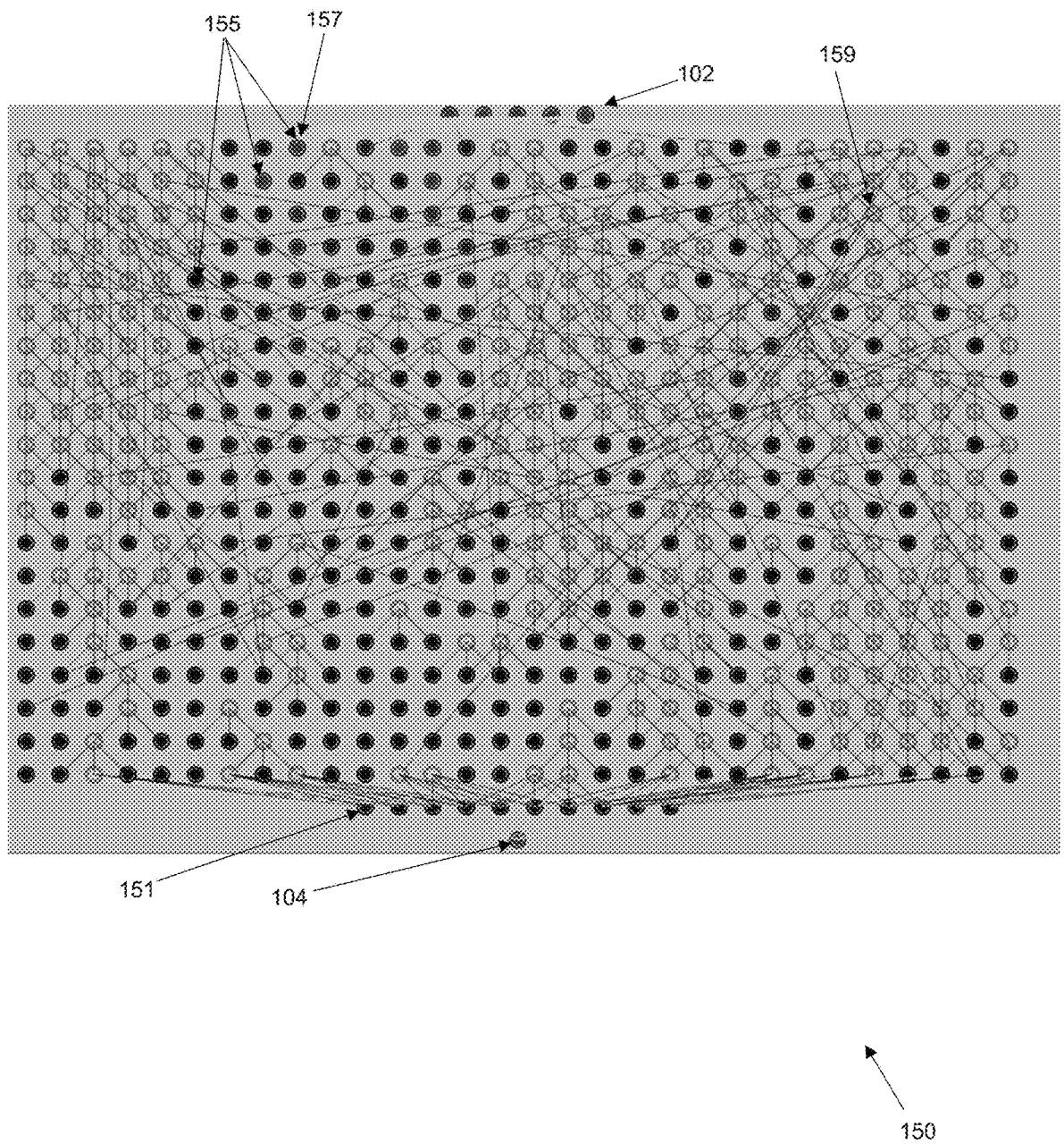
Figure 17:
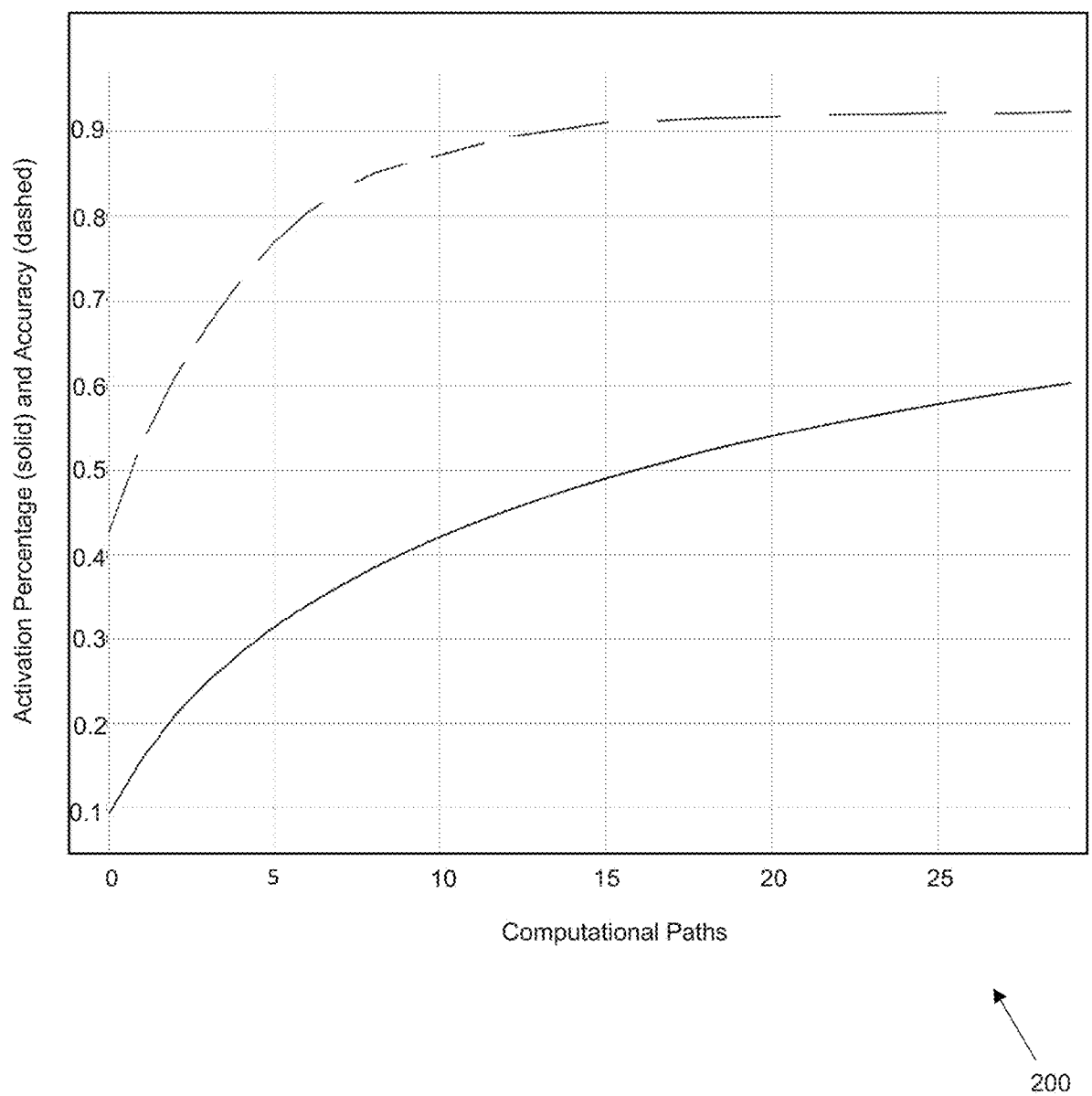
FIG. 17 is a graph illustrating node activation percentage versus computational paths for the exemplary character recognition examples of operation in accordance with embodiments of the present disclosure.

Similarly, networks for the digit "8" example are shown in FIGS. 14 through 16, with FIG. 14 showing the network 130 and activated nodes (e.g., 135) after sampling one computational path, FIG. 15 showing the network 140 and activated nodes (e.g., 145) after sampling five computational paths and FIG. 16 showing the network 150 and activated nodes (e.g., 155) after sampling ten computational paths. The activated nodes are shaded in FIGS. 14 through 16. The input nodes 102 are shown at the top, with calculations proceeding downward toward the output SoftMax node 104 at the bottom of the network.

The links between nodes can indicate synaptic computation where the values have been computed, though not necessarily activated. Further, some nodes (e.g., 137, 147, 157) have a higher activation probability and some nodes (e.g., 139, 149, 159) have not been activated. In FIG. 15, hidden nodes 143 have activated directly without needing to start a computational path from the inputs 102. Thus, computational paths can be initiated from one or both hidden nodes, such as by eventually activating node 144 in FIG. 15 directly by the two hidden layer's nodes 143. Further, one or both hidden nodes 143 will have been or may have been activated by a previous computational path. In FIGS. 11 through 16, each node of the second-to-last row (101 in FIG. 11, 111 in FIG. 12, 121 in FIG. 13, 131 in FIG. 14, 141 in FIGS. 15 and 151 in FIG. 16) represents a digit category (e.g., 0, 1, 2 . . . 9).

As will be appreciated, the activated nodes differ for the two different samples, i.e., the activated nodes in FIG. 11 are different from the activated nodes in FIG. 14, the activated nodes in FIG. 12 are different from the activated nodes in FIG. 15 and the activated nodes in FIG. 13 are different from the activated nodes in FIG. 16. Further, it will be appreciated that the number of activated nodes increases with the number of computational paths. Thus, there are more shaded (activated) nodes in FIG. 12 than in FIG. 11, more shaded (activated) nodes in FIG. 13 than in FIG. 12, more shaded (activated) nodes in FIG. 15 than in FIG. 14, and more shaded (activated) nodes in FIG. 16 than in FIG. 15. Additionally, it will be appreciated that after ten computational paths (represented in FIGS. 13 and 16), the relatively simpler digit "6" query has a correct recognition probability of 99.96% achieved activating only 37% of nodes. Conversely, the more complex digit "8" query results in a probability of the input being recognized as an "8" of only 35.23% (which is still a correct recognition, since it is the digit with the highest probability), activating 46% of the network, which is almost ten percent more than the simpler query for the digit "6".

Beyond the two specific examples illustrated in FIGS. 11 through 16 above, we can assess the ability of embodiments of the present disclosure to use computational resources efficiently in the system and/or network by plotting the percentage of activated nodes and the overall accuracy for the entire test dataset as more computational paths are used. For example, from the graph 200 in FIG. 17, we see a clear relationship between activation percentage (solid line) and overall prediction accuracy (dashed line) based on the number of computational paths employed. As can be seen, activating approximately fifteen paths results in an average activation percentage of 49% yet with an accuracy of 91%, close to the asymptotic 92% accuracy using this network.

Figure 18:
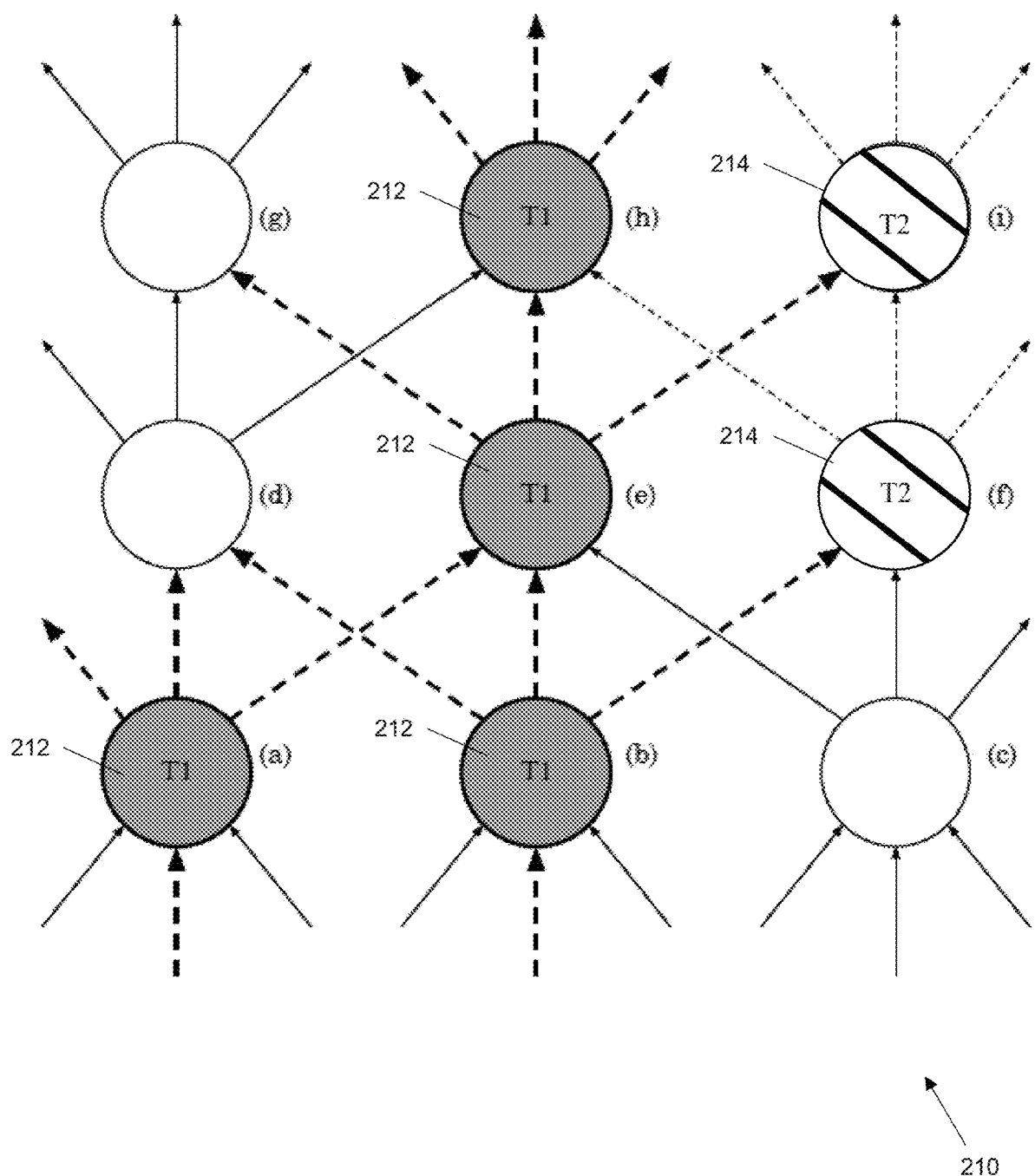
FIGS. 18-21 are exemplary diagrams showing computational paths and selective activation in accordance with further embodiments of the present disclosure.

The diagram 210 in FIG. 18 illustrates another embodiment according to the present disclosure. As shown in FIG. 18, darkened nodes (a), (b), (c) and (h) (illustrated at 212) are activated on a first computational path at a first time, wherein a first minimum threshold for activation has been established. In various embodiments, the nodes shown at 212 are activated based on having a probability of activation that is higher than the first minimum threshold. Next, on a second pass, a second minimum threshold for activation is established and the second minimum threshold is lower than the first minimum threshold. In the second pass, additional nodes (f) and (i) (illustrated at 214 in a striped pattern) are activated along with the nodes shown at 212, and the additional nodes shown at 214 are activated along with nodes shown at 212 based on having a probability of activation that is higher than the second minimum threshold. This process can continue whereby additional nodes are selectively activated and additional (lower) minimum thresholds are established whereupon new nodes are activated with each pass of the network as long as the activation rate (i.e., probability of activation for a given node) is higher than the current minimum threshold. It will be appreciated that the same approach can apply whether activating nodes or synapses or both. The lowering of the minimum threshold allows for further nodes and/or synapses to be activated.

Thus, as illustrated by FIG. 18, in various embodiments of the present disclosure, a method for partially or selectively activating a stochastic neural network includes providing nodes and synapses, wherein each synapse connects a respective pair of nodes, and wherein a respective activation weight is associated with a respective synapse or node. The method involves selectively activating different subsets of nodes based on sampling computational paths traversing the stochastic neural network and further based on different minimum thresholds for activation. Thus, as illustrated in FIG. 18, a first subset of nodes (all nodes 212) is selectively activating based on sampling computational paths traversing the stochastic neural network based on a first minimum threshold for activation. A second subset of nodes (e.g., all nodes 212 and 214) are then activated based on again sampling computational paths traversing the stochastic neural network but with a second minimum threshold for activation. In various embodiments, the second minimum threshold is lower than the first minimum threshold, which results in the second subset of nodes being greater in number than the first subset of the plurality of nodes.

In various embodiments, the different minimum thresholds are multiple individual minimum thresholds. For example, 32.2%, 29.8%, 24.0% and 17.1% are each an individual minimum threshold. Further, selectively activating different subsets of nodes can include repeatedly and selectively activating different subsets of nodes based on a different individual minimum threshold, where the individual minimum threshold is reduced for each selective activation of the different subsets of nodes. Thus, processing may start with a first or initial minimum threshold such as 32.2% in the list above, where the first or initial minimum threshold is the highest threshold employed. By reducing the minimum threshold, more nodes and/or synapses are likely to be activated upon traversing the network. In various embodiments, the individual minimum threshold is reduced based on or by a predetermined amount. Alternatively, individual minimum thresholds can be established as specific values. In still further embodiments, each individual minimum threshold can be reduced to a degree determined by a previous selective activation of a subset of nodes. In various embodiments, the individual minimum threshold can be deterministic or stochastic, such as a random draw from a Beta distribution, for example.

Figure 19:
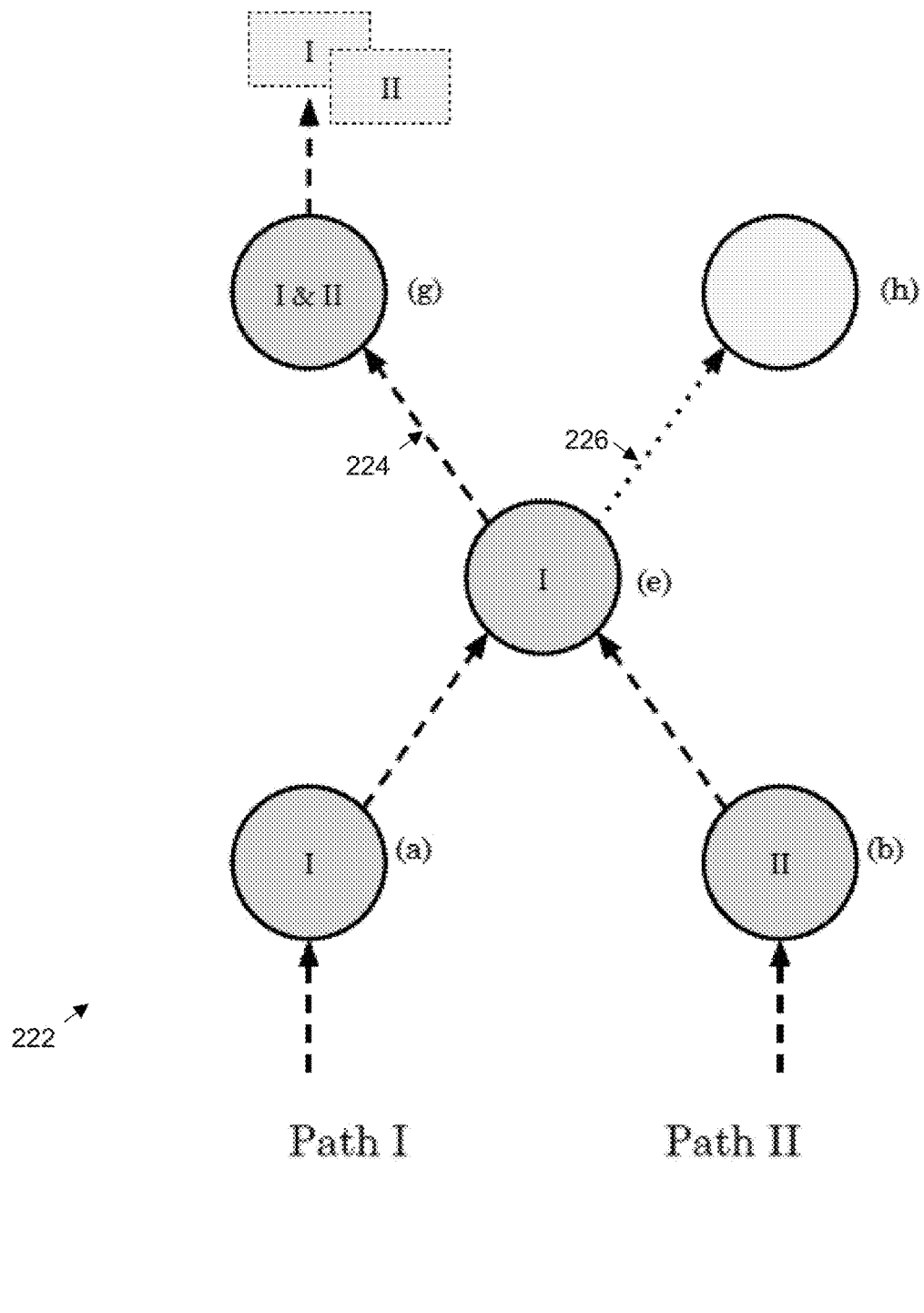

The diagram 220 in FIG. 19 illustrates another embodiment according to the present disclosure. As shown in FIG. 19, Paths I and II traverse the sub-network 222 having nodes (a), (b), (c), (g) and (h). Path I passes through nodes (a), (c) and (g) and Path II passes through nodes (b), (c) and (g). In this embodiment, an activated synapse (e.g., synapse 224 between nodes (e) and (g) maintains its initial activation level. Subsequent changes in inputs to the origin node (e.g., node (e) is the origin node for synapse 224) will only modify inactivated synapses such as synapse 226 between nodes (e) and (h), possibly adjusting the new synaptic activation on a pro-rata basis (i.e., modifying the portion of routing that is not yet assigned to activated synapses). As shown in FIG. 19, once Path I traversal has occurred, node (g) is activated. Since node (g) was activated by Path I, the value for the synapse 224 is fixed. The arrival of a new path (e.g., Path II) with updated values will only affect synapse 226 from node (e) to (h) and node (h) if a subsequent path were to traverse it. Path II, having arrived after Path I, results in an update of the synaptic routing values and the total expected activation rate of node (e). In this way, the system, network and method of the present disclosure can avoid having to update previously computed values, making the inference task more computationally efficient.

Figure 20:
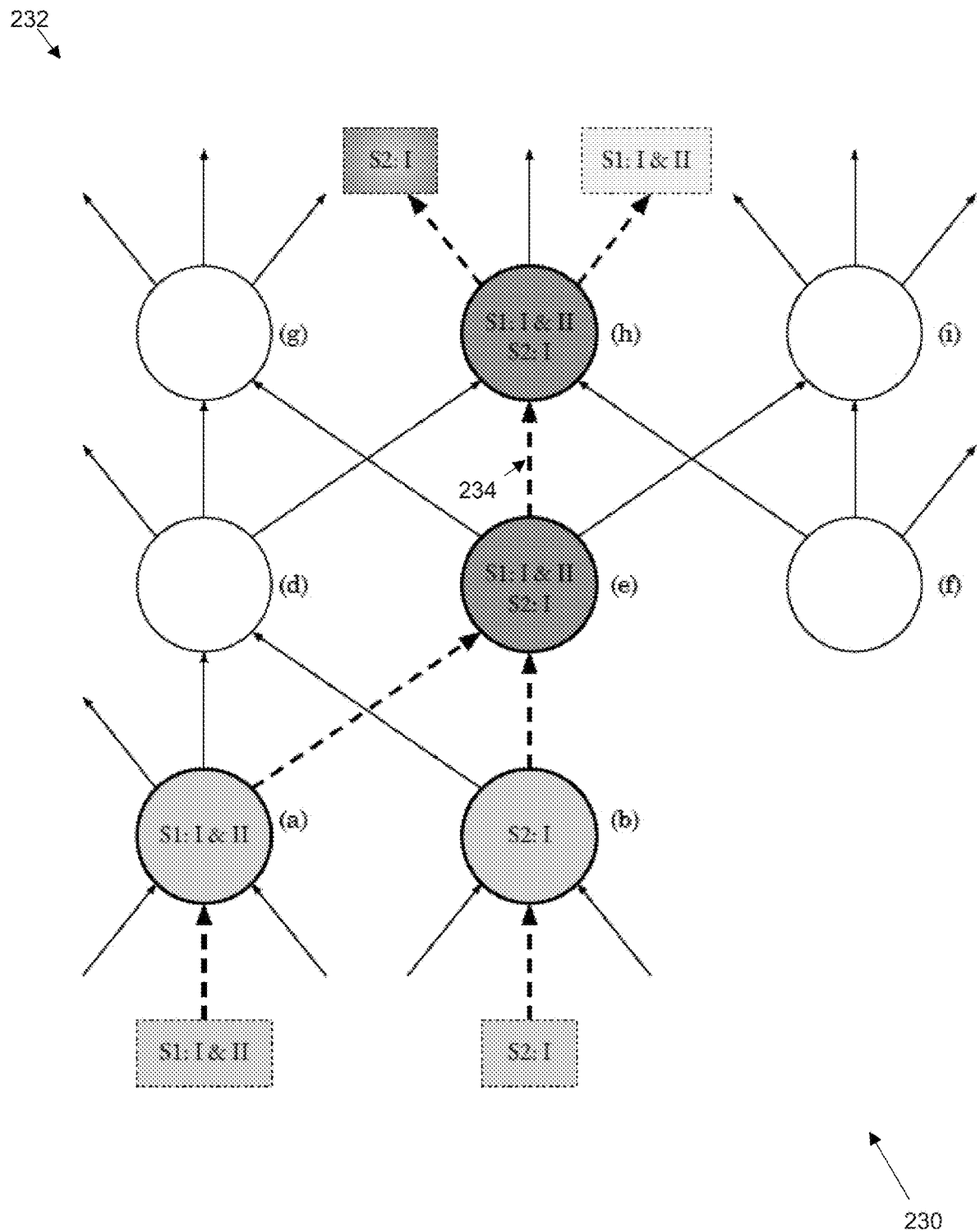

The diagram 230 in FIG. 20 illustrates another embodiment according to the present disclosure. As shown in FIG. 20, Paths S1:I and S1:II traverse the network 232 over nodes (a), (e) and (h). Path S2:I is activated for a different sample and traverses the network 232 over nodes (b), (c) and (h). For example, Paths S1:I and S1:II may belong to a first digit recognition problem as described above, while Path S2:I is activated by a second digit recognition problem. Despite the paths being activated by different samples, they interact as if they had been activated by the same samples as per the previous examples. This allows a memory of both a single sample and a sequence of samples. In this embodiment, an activated synapse (e.g., synapse 234 between nodes (c) and (h) maintain its value over multiple inference queries (i.e., where synaptic values activated and computed by previous inputs are used by computational paths of subsequent inputs). In various embodiments, such synapses maintain their value up to a decay time, which can be pre-determined and which can reset the synaptic value or gradually decrease it.

Figure 21:
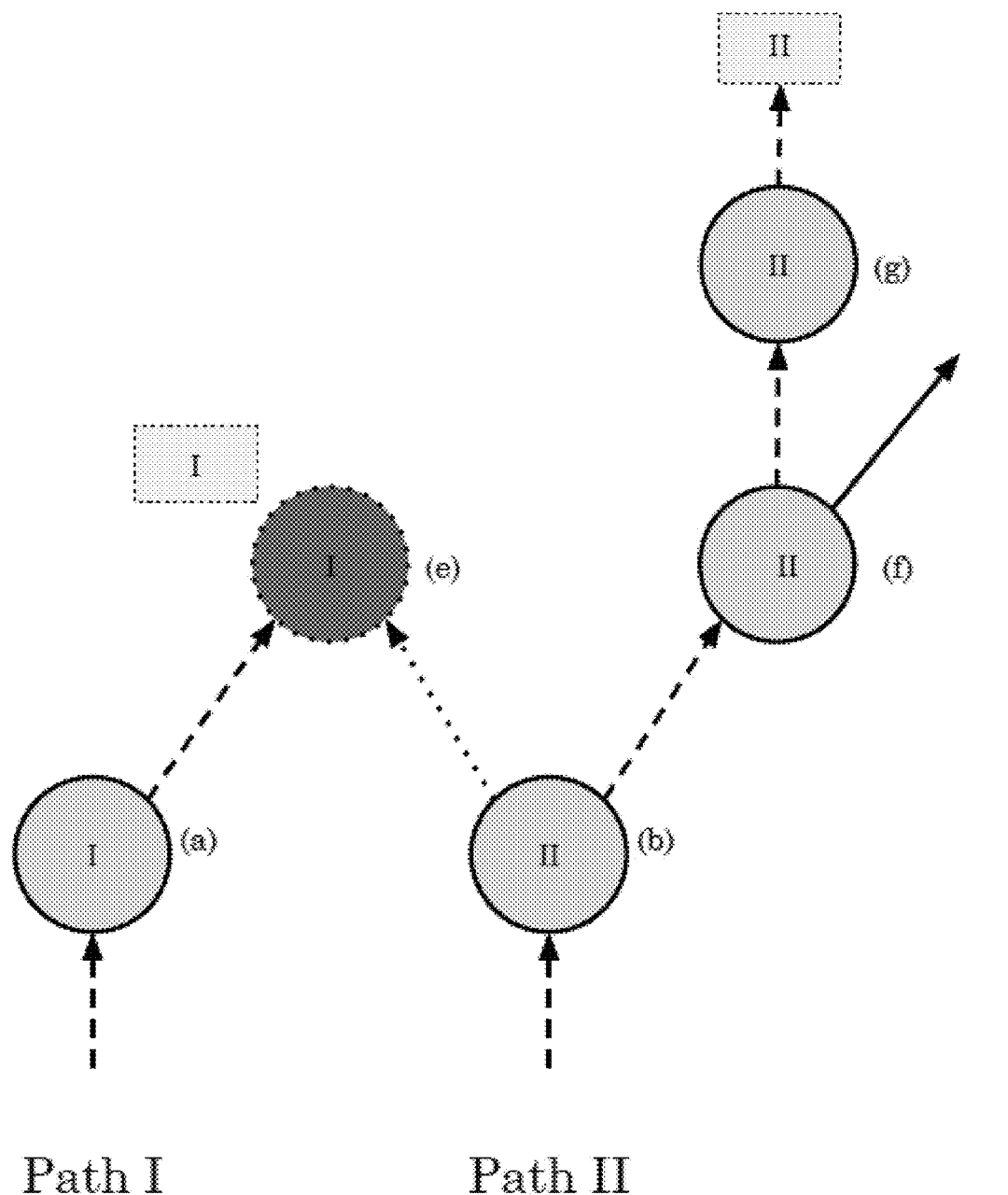

The diagram 240 in FIG. 21 illustrates another embodiment according to the present disclosure. As shown in FIG. 21, Path I traverses network 242 over nodes (a) and (c), and node (c) is a blocking node by construction. Once Path I has activated node (e), a subsequent Path (e.g., Path II) can only route in a different direction. As shown in FIG. 21, Path II traverses network 242 over nodes (b), (f) and (g). It will be appreciated that some portion (i.e., one or more) of the nodes or synapses in the network 242 can be a blocking node or synapse. In various embodiments, an activation rate for a node or synapse flowing through a blocking node or a blocking synapse can either be redistributed to other nodes or synapses or absorbed by the blocking node or synapse. It will be appreciated that nodes and/or synapses can be designated as blocking synapses at network initialization.

In various embodiments, a computing system is provided having a stochastic neural network, wherein the stochastic neural network includes nodes and synapses, wherein each synapse connects a respective pair of nodes. A first subset of nodes is selectively activated based on sampling a first group of computational paths traversing the stochastic neural network based on a first minimum threshold for activation, wherein the first minimum threshold for activation is subsequently reduced to a second minimum threshold for activation. A second subset of nodes is selectively activated based on sampling a second group of computational paths traversing the stochastic neural network based on the second minimum threshold for activation. As described elsewhere herein, the nodes can include at least one input node, at least one output node and at least two hidden nodes, wherein the hidden nodes are positioned between the input node(s) and the output node(s), and wherein sampling the computational paths includes initiating each of the groups of computational paths from one or more of the hidden nodes, wherein initiating hidden node(s) has (have) been activated by a previous computational path.

As described, the present disclosure contemplates a variety of different systems each having one or more of a plurality of different features, attributes, or characteristics. A "system" as used herein can refer, for example, to various configurations of one or more computing networks, processing elements or computing devices, such as desktop computers, laptop computers, tablet computers, personal digital assistants, mobile phones, and other mobile computing devices. In certain embodiments in which the system includes a computing device, the computing device is any suitable computing device (such as a server) that includes at least one processor and at least one memory device or data storage device. As further described herein, the computing device includes at least one processor configured to transmit and receive data or signals representing events, messages, commands, or any other suitable information. The processor of the computing device is configured to execute the events, messages, or commands represented by such data or signals in conjunction with the operation of the computing device. As described elsewhere herein, embodiments of the disclosure can be developed on specialized hardware where nodes and synapses contain the calculation (and stochastic sampling) capabilities.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing, including a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

It will be appreciated that all of the disclosed methods and procedures herein can be implemented using one or more computer programs, processing elements or components. These programs, processing elements and/or components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices, elements or components of the present disclosure that are in communication with each other do not need to be in continuous communication with each other. Further, devices, elements or components in communication with other devices or components can communicate directly or indirectly through one or more intermediate devices, elements or components or other intermediaries. Further, descriptions of embodiments of the present disclosure herein wherein several devices, elements and/or components are described as being in communication with one another does not imply that all such devices, elements or components are required, or that each of the disclosed devices, elements or components must communicate with every other device, element or component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers, processing elements and/or computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server.

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

Embodiments of the present disclosure may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A method for partially or selectively activating a stochastic neural network, comprising:
    providing a stochastic neural network comprising a plurality of nodes;
    providing a plurality of synapses, wherein each of the plurality of synapses comprises a connection between a respective pair of the plurality of nodes;
    providing a plurality of activation weights, wherein each of the plurality of activation weights is associated with a respective synapse of the plurality of synapses or a respective node of the plurality of nodes; and selectively activating different subsets of the plurality of nodes based on sampling a plurality of computational paths traversing the stochastic neural network, wherein selectively activating different subsets of the plurality of nodes is further based on different minimum thresholds for activation.

2. The method of claim 1, wherein selectively activating different subsets of the plurality of nodes comprises selectively activating a first subset of the plurality of nodes based on sampling a first plurality of computational paths traversing the stochastic neural network based on a first minimum threshold for activation, and further comprises selectively activating a second subset of the plurality of nodes based on sampling a second plurality of computational paths traversing the stochastic neural network based on a second minimum threshold for activation, wherein the second minimum threshold is lower than the first minimum threshold.

3. The method of claim 1, wherein the different minimum thresholds comprise a plurality of individual minimum thresholds, and wherein selectively activating different subsets of the plurality of nodes comprises repeatedly and selectively activating different subsets of nodes based on an individual minimum threshold from the plurality of individual minimum thresholds, wherein the individual minimum threshold is reduced for each selective activation of the different subsets of nodes.

4. The method of claim 3, wherein the plurality of individual minimum thresholds comprise a first minimum threshold and a subsequent minimum threshold, wherein the subsequent minimum threshold is lower than the first minimum threshold.

5. The method of claim 3, wherein the individual minimum threshold is reduced based on a predetermined amount.

6. The method of claim 3, wherein the individual minimum threshold is reduced by a degree determined by a previous selective activation of a subset of the plurality of nodes.

7. The method of claim 3, wherein the individual minimum threshold is deterministic.

8. The method of claim 3, wherein the individual minimum threshold is stochastic.

9. The method of claim 1, wherein selectively activating different subsets of the plurality of nodes comprises activating nodes comprising a probability of activation that is higher than a current minimum threshold of the different minimum thresholds.

10. The method of claim 1, wherein the plurality of nodes comprises at least one input node, at least one output node and at least two hidden nodes, wherein the at least two hidden nodes are positioned between the at least one input node and the at least one output node in the stochastic neural network, and wherein sampling the plurality of computational paths comprises initiating each of the plurality of computational paths from a first of the at least two hidden nodes, wherein the first of the at least two hidden nodes has been activated by a previous computational path.

11. A computing system, comprising:
a stochastic neural network comprising:
a plurality of nodes; and
a plurality of synapses, wherein each synapse of the plurality of synapses connects a respective pair of the plurality of nodes;
wherein a first subset of the plurality of nodes is selectively activated based on sampling a first plurality of computational paths traversing the stochastic neural network based on a first minimum threshold for activation;
wherein the first minimum threshold for activation is subsequently reduced to a second minimum threshold for activation; and
wherein a second subset of the plurality of nodes is selectively activated based on sampling a second plurality of computational paths traversing the stochastic neural network based on the second minimum threshold for activation.

12. The computing system of claim 11, wherein the plurality of nodes comprises at least one input node, at least one output node and at least two hidden nodes, wherein the at least two hidden nodes are positioned between the at least one input node and the at least one output node in the stochastic neural network, and wherein sampling the plurality of computational paths comprises initiating each of the plurality of computational paths from a first of the at least two hidden nodes, wherein the first of the at least two hidden nodes has been activated by a previous computational path.

13. The computing system of claim 11, wherein the first and second minimum thresholds are predetermined.

14. The computing system of claim 11, wherein the second minimum threshold is reduced by a degree determined by the selective activation of the first subset of the plurality of nodes.

15. The computing system of claim 11, wherein selectively activating the first subset of the plurality of nodes comprises activating nodes comprising a probability of activation that is higher than the first minimum threshold for activation.

16. The computing system of claim 15, wherein selectively activating the second subset of the plurality of nodes comprises activating nodes comprising a probability of activation that is higher than the second minimum threshold for activation.

17. The computing system of claim 16, wherein the second subset of the plurality of nodes is greater in number than the first subset of the plurality of nodes.

18. The computing system of claim 11, wherein an activated synapse maintains an initial synapse activation level and wherein subsequent changes in inputs to an origin node from the plurality of nodes for the activated synapse will only modify one or more inactivated synapses.

19. The computing system of claim 18, wherein a portion of routing not yet assigned to one or more activated synapses is modified on a pro-rata basis.

20. The computing system of claim 11, wherein an activated synapse maintains a related synapse value over multiple inference queries.

21. The computing system of claim 20, wherein the synapse value, upon being activated and computed by previous inputs, is used by one or more computational paths of a subsequent input.

22. The computing system of claim 21, wherein the synapse value is used by one or more computational paths of a subsequent input up to a decay time, wherein the decay time can reset the synapse value or gradually decrease the synapse value.

23. The computing system of claim 11, wherein a portion of the plurality of nodes or a portion of the plurality of synapses blocks a subsequent node in the stochastic neural network.

24. The computing system of claim 23, wherein an activation rate flowing through a blocking synapse or a blocking node can either be redistributed or absorbed by the blocking node or the blocking synapse.

\* \* \* \* \*